United States Patent
Cohen

(10) Patent No.: US 7,674,361 B2
(45) Date of Patent: Mar. 9, 2010

(54) MICRO-TURBINES, ROLLER BEARINGS, BUSHINGS, AND DESIGN OF HOLLOW CLOSED STRUCTURES AND FABRICATION METHODS FOR CREATING SUCH STRUCTURES

(75) Inventor: Adam L. Cohen, Van Nuys, CA (US)

(73) Assignee: Microfabrica Inc., Van Nuys, CA (US)

( * ) Notice: Subject to any disclaimer, the term of this patent is extended or adjusted under 35 U.S.C. 154(b) by 812 days.

(21) Appl. No.: 11/441,578

(22) Filed: May 26, 2006

(65) Prior Publication Data
US 2006/0283712 A1 Dec. 21, 2006

Related U.S. Application Data

(63) Continuation-in-part of application No. 10/949,744, filed on Sep. 24, 2004.

(60) Provisional application No. 60/685,130, filed on May 26, 2005, provisional application No. 60/506,016, filed on Sep. 24, 2003.

(51) Int. Cl.
*C25D 17/00* (2006.01)

(52) U.S. Cl. .................. 205/118; 205/122; 205/170; 205/223

(58) Field of Classification Search ............... 205/118, 205/122, 170, 181, 182, 220, 223
See application file for complete search history.

(56) References Cited

U.S. PATENT DOCUMENTS

| | | | |
|---|---|---|---|
| 4,797,211 A | 1/1989 | Ehrfeld et al. | 210/321.84 |
| 5,054,522 A | 10/1991 | Kowanz et al. | 137/625.33 |
| 5,190,637 A | 3/1993 | Guckel | 205/118 |
| 5,400,824 A | 3/1995 | Gschwendtner et al. | 137/625.33 |
| 5,718,618 A | 2/1998 | Guckel et al. | 451/41 |
| 5,932,940 A | 8/1999 | Epstein et al. | 290/52 |
| 6,027,630 A | 2/2000 | Cohen | 205/135 |
| 6,123,316 A | 9/2000 | Biegelsen et al. | 251/129.01 |
| 6,392,313 B1 | 5/2002 | Epstein et al. | 257/40 |
| 6,431,212 B1 | 8/2002 | Hayenga et al. | 137/855 |
| 6,877,964 B2 | 4/2005 | Burns et al. | 417/410.1 |
| 6,887,615 B1 | 5/2005 | Sherman et al. | 429/61 |

(Continued)

OTHER PUBLICATIONS

U.S. Appl. No. 60/043,742, filed Apr. 4, 1997, Cohen, et al.

(Continued)

*Primary Examiner*—Nam X Nguyen
*Assistant Examiner*—Luan V Van
(74) *Attorney, Agent, or Firm*—Dennis R. Smalley

(57) ABSTRACT

Multi-layer fabrication methods (e.g. electrochemical fabrication methods) for forming microscale and mesoscale devices or structures (e.g. turbines) provide bushings or roller bearing that allow rotational or linear motion which is constrained by multiple structural elements spaced from one another by gaps that are effectively less than minimum features sizes associated with the individual layers used to form the structures. In some embodiments, features or protrusions formed on different layers on opposing surfaces are offset along the axis of layer stacking so as to bring the features into positions that are closer than allowed by the minimum features sizes associated with individual layers. In other embodiments, interference is used to create effective spacings that are less than the minimum features sizes.

14 Claims, 14 Drawing Sheets

U.S. PATENT DOCUMENTS

| | | | | |
|---|---|---|---|---|
| 6,962,170 | B1 | 11/2005 | Sherman et al. | 137/625.33 |
| 7,066,205 | B2 | 6/2006 | Sherman et al. | 137/625.33 |
| 2004/0007470 | A1 | 1/2004 | Smalley | 205/118 |
| 2005/0023144 | A1 | 2/2005 | Cohen et al. | 205/118 |
| 2005/0023145 | A1 | 2/2005 | Cohen et al. | 205/118 |
| 2005/0029109 | A1 | 2/2005 | Zhang et al. | 205/118 |
| 2005/0032375 | A1 | 2/2005 | Lockard et al. | 216/41 |
| 2005/0045585 | A1 | 3/2005 | Zhang et al. | 216/58 |
| 2005/0053849 | A1 | 3/2005 | Cohen et al. | 428/600 |
| 2005/0104609 | A1 | 5/2005 | Arat et al. | 324/754 |
| 2005/0126916 | A1 | 6/2005 | Lockard et al. | 205/50 |
| 2006/0153480 | A1 | 7/2006 | Boedo et al. | 384/215 |

OTHER PUBLICATIONS

Cohen, et al., "EFAB: Batch Production of Functional, Fully-Dense Metal Parts with Micron-Scale Features", Proc. 9th Solid Freeform Fabrication, The University of Texas at Austin, Aug. 1998, pp. 161.

Adam L. Cohen, et al., "EFAB: Rapid, Low-Cost Desktop Micromachining of High Aspect Ratio True 3-D MEMS", Proc. 12th IEEE Micro Electro Mechanical Systems Workshop, IEEE, Jan. 17-21, 1999, pp. 244-251.

"Microfabrication—Rapid Prototyping's Killer Application", Rapid Prototyping Report, CAD/CAM Publishing, Inc., Jun. 1999, pp. 1-5.

Adam L. Cohen, "3-D Micromachining by Electrochemical Fabrication", Micromachine Devices, Mar. 1999, pp. 6-7.

Gang Zhang, et al., "EFAB: Rapid Desktop Manufacturing of True 3-D Microstructures", Proc. 2nd International Conference on Integrated MicroNanotechnology for Space Applications, The Aerospace Co., Apr. 1999.

F. Tseng, et al., "EFAB: High Aspect Ratio, Arbitrary 3-D Metal Microstructures Using a Low-Cost Automated Batch Process", 3rd International Workshop on High Aspect Ratio Microstructure Technology (HARMST'99), Jun. 1999.

Adam L. Cohen, et al., "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, Sep. 1999.

F. Tseng, et al., "EFAB: High Aspect Ratio, Arbitrary 3-D Metal Microstructures Using a Low-Cost Automated Batch Process", MEMS Symposium, ASME 1999 International Mechanical Engineering Congress and Exposition, Nov. 1999.

Adam L. Cohen, "Electrochemical Fabrication (EFABTM)", Chapter 19 of the MEMS Handbook, edited by Mohamed Gad-El-Hak, CRC Press, 2002, pp. 19/1-19/23.

Adam L. Cohen, et al., "Monolithic 3-D Microfabrication of Mechanisms with Multiple Independently-Moving Parts", 2005 ASME International Mechanical Engineering Congress and Exposition, Nov. 5-11, 2005, Orlando, Florida USA.

MICRO-TURBINES, ROLLER BEARINGS, BUSHINGS, AND DESIGN OF HOLLOW CLOSED STRUCTURES AND FABRICATION METHODS FOR CREATING SUCH STRUCTURES

RELATED APPLICATIONS

This application claims benefit of U.S. Provisional Application No. 60/685,130, filed May 26, 2005 and is a continuation-in-part of U.S. patent application Ser. No. 10/949,744, filed Sep. 24, 2004 which in turn claims benefit of U.S. Provisional Patent Application No. 60/506,016 filed Sep. 24, 2003. Each of these applications is hereby incorporated herein by reference as if set forth in full.

FIELD OF THE INVENTION

Some embodiments of this invention relate to the field of electrochemical fabrication and the associated formation of multi-layer three-dimensional structures (e.g. microscale or mesoscale structures). Some embodiments relate to the formation of micro-devices (e.g. micro-turbines that are driven by fluids) that include rotary or recirculating linear roller "interference bearings", "interference bushings", and/or "offset bearings" or "offset bushings". Some embodiments relate to designs and methods of designing structures that are hollow and closed or nearly closed once put into service.

BACKGROUND OF THE INVENTION

A technique for forming three-dimensional structures (e.g. parts, components, devices, and the like) from a plurality of adhered layers was invented by Adam L. Cohen and is known as Electrochemical Fabrication. It is being commercially pursued by Microfabrica Inc. (formerly MEMGen® Corporation) of Burbank, Calif. under the name EFAB™. This technique was described in U.S. Pat. No. 6,027,630, issued on Feb. 22, 2000. This electrochemical deposition technique allows the selective deposition of a material using a unique masking technique that involves the use of a mask that includes patterned conformable material on a support structure that is independent of the substrate onto which plating will occur. When desiring to perform an electrodeposition using the mask, the conformable portion of the mask is brought into contact with a substrate while in the presence of a plating solution such that the contact of the conformable portion of the mask to the substrate inhibits deposition at selected locations. For convenience, these masks might be generically called conformable contact masks; the masking technique may be generically called a conformable contact mask plating process. More specifically, in the terminology of Microfabrica Inc. (formerly MEMGen® Corporation) of Burbank, Calif. such masks have come to be known as INSTANT MASKS™ and the process known as INSTANT MASKING™ or INSTANT MASK™ plating. Selective depositions using conformable contact mask plating may be used to form single layers of material or may be used to form multi-layer structures. The teachings of the '630 patent are hereby incorporated herein by reference as if set forth in full herein. Since the filing of the patent application that led to the above noted patent, various papers about conformable contact mask plating (i.e. INSTANT MASKING) and electrochemical fabrication have been published:

(1) A. Cohen, G. Zhang, F. Tseng, F. Mansfeld, U. Frodis and P. Will, "EFAB: Batch production of functional, fully-dense metal parts with micro-scale features", Proc. 9th Solid Freeform Fabrication, The University of Texas at Austin, p 161, August 1998.

(2) A. Cohen, G. Zhang, F. Tseng, F. Mansfeld, U. Frodis and P. Will, "EFAB: Rapid, Low-Cost Desktop Micromachining of High Aspect Ratio True 3-D MEMS", Proc. 12th IEEE Micro Electro Mechanical Systems Workshop, IEEE, p244, January 1999.

(3) A. Cohen, "3-D Micromachining by Electrochemical Fabrication", Micromachine Devices, March 1999.

(4) G. Zhang, A. Cohen, U. Frodis, F. Tseng, F. Mansfeld, and P. Will, "EFAB: Rapid Desktop Manufacturing of True 3-D Microstructures", Proc. 2nd International Conference on Integrated Micronanotechnology for Space Applications, The Aerospace Co., Apr. 1999.

(5) F. Tseng, U. Frodis, G. Zhang, A. Cohen, F. Mansfeld, and P. Will, "EFAB: High Aspect Ratio, Arbitrary 3-D Metal Microstructures using a Low-Cost Automated Batch Process", 3rd International Workshop on High Aspect Ratio MicroStructure Technology (HARMST'99), June 1999.

(6) A. Cohen, U. Frodis, F. Tseng, G. Zhang, F. Mansfeld, and P. Will, "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, September 1999.

(7) F. Tseng, G. Zhang, U. Frodis, A. Cohen, F. Mansfeld, and P. Will, "EFAB: High Aspect Ratio, Arbitrary 3-D Metal Microstructures using a Low-Cost Automated Batch Process", MEMS Symposium, ASME 1999 International Mechanical Engineering Congress and Exposition, November, 1999.

(8) A. Cohen, "Electrochemical Fabrication (EFABTM)", Chapter 19 of The MEMS Handbook, edited by Mohamed Gad-EI-Hak, CRC Press, 2002.

(9) Microfabrication—Rapid Prototyping's Killer Application", pages 1-5 of the Rapid Prototyping Report, CAD/CAM Publishing, Inc., June 1999.

The disclosures of these nine publications are hereby incorporated herein by reference as if set forth in full herein.

The electrochemical deposition process may be carried out in a number of different ways as set forth in the above patent and publications. In one form, this process involves the execution of three separate operations during the formation of each layer of the structure that is to be formed:

1. Selectively depositing at least one material by electrodeposition upon one or more desired regions of a substrate.

2. Then, blanket depositing at least one additional material by electrodeposition so that the additional deposit covers both the regions that were previously selectively deposited onto, and the regions of the substrate that did not receive any previously applied selective depositions.

3. Finally, planarizing the materials deposited during the first and second operations to produce a smoothed surface of a first layer of desired thickness having at least one region containing the at least one material and at least one region containing at least the one additional material.

After formation of the first layer, one or more additional layers may be formed adjacent to the immediately preceding layer and adhered to the smoothed surface of that preceding layer. These additional layers are formed by repeating the first through third operations one or more times wherein the formation of each subsequent layer treats the previously formed layers and the initial substrate as a new and thickening substrate.

Once the formation of all layers has been completed, at least a portion of at least one of the materials deposited is generally removed by an etching process to expose or release the three-dimensional structure that was intended to be formed.

The preferred method of performing the selective electrodeposition involved in the first operation is by conformable contact mask plating. In this type of plating, one or more conformable contact (CC) masks are first formed. The CC masks include a support structure onto which a patterned conformable dielectric material is adhered or formed. The conformable material for each mask is shaped in accordance with a particular cross-section of material to be plated. At least one CC mask is needed for each unique cross-sectional pattern that is to be plated.

The support for a CC mask is typically a plate-like structure formed of a metal that is to be selectively electroplated and from which material to be plated will be dissolved. In this typical approach, the support will act as an anode in an electroplating process. In an alternative approach, the support may instead be a porous or otherwise perforated material through which deposition material will pass during an electroplating operation on its way from a distal anode to a deposition surface. In either approach, it is possible for CC masks to share a common support, i.e. the patterns of conformable dielectric material for plating multiple layers of material may be located in different areas of a single support structure. When a single support structure contains multiple plating patterns, the entire structure is referred to as the CC mask while the individual plating masks may be referred to as "submasks". In the present application such a distinction will be made only when relevant to a specific point being made.

In preparation for performing the selective deposition of the first operation, the conformable portion of the CC mask is placed in registration with and pressed against a selected portion of the substrate (or onto a previously formed layer or onto a previously deposited portion of a layer) on which deposition is to occur. The pressing together of the CC mask and substrate occur in such a way that all openings, in the conformable portions of the CC mask contain plating solution. The conformable material of the CC mask that contacts the substrate acts as a barrier to electrodeposition while the openings in the CC mask that are filled with electroplating solution act as pathways for transferring material from an anode (e.g. the CC mask support) to the non-contacted portions of the substrate (which act as a cathode during the plating operation) when an appropriate potential and/or current are supplied.

An example of a CC mask and CC mask plating are shown in FIGS. 1A-1C. FIG. 1A shows a side view of a CC mask 8 consisting of a conformable or deformable (e.g. elastomeric) insulator 10 patterned on an anode 12. The anode has two functions. One is as a supporting material for the patterned insulator 10 to maintain its integrity and alignment since the pattern may be topologically complex (e.g., involving isolated "islands" of insulator material). The other function is as an anode for the electroplating operation. FIG. 1A also depicts a substrate 6 separated from mask 8. CC mask plating selectively deposits material 22 onto a substrate 6 by simply pressing the insulator against the substrate then electrodepositing material through apertures 26a and 26b in the insulator as shown in FIG. 1B. After deposition, the CC mask is separated, preferably non-destructively, from the substrate 6 as shown in FIG. 1C. The CC mask plating process is distinct from a "through-mask" plating process in that in a through-mask plating process the separation of the masking material from the substrate would occur destructively. As with through-mask plating, CC mask plating deposits material selectively and simultaneously over the entire layer. The plated region may consist of one or more isolated plating regions where these isolated plating regions may belong to a single structure that is being formed or may belong to multiple structures that are being formed simultaneously. In CC mask plating as individual masks are not intentionally destroyed in the removal process, they may be usable in multiple plating operations.

Another example of a CC mask and CC mask plating is shown in FIGS. 1D-1G. FIG. 1D shows an anode 12' separated from a mask 8' that includes a patterned conformable material 10' and a support structure 20. FIG. 1D also depicts substrate 6 separated from the mask 8'. FIG. 1E illustrates the mask 8' being brought into contact with the substrate 6. FIG. 1F illustrates the deposit 22' that results from conducting a current from the anode 12' to the substrate 6. FIG. 1G illustrates the deposit 22' on substrate 6 after separation from mask 8'. In this example, an appropriate electrolyte is located between the substrate 6 and the anode 12' and a current of ions coming from one or both of the solution and the anode are conducted through the opening in the mask to the substrate where material is deposited. This type of mask may be referred to as an anodeless INSTANT MASK™ (AIM) or as an anodeless conformable contact (ACC) mask.

Unlike through-mask plating, CC mask plating allows CC masks to be formed completely separate from the fabrication of the substrate on which plating is to occur (e.g. separate from a three-dimensional (3D) structure that is being formed). CC masks may be formed in a variety of ways, for example, a photolithographic process may be used. All masks can be generated simultaneously, e.g. prior to structure fabrication rather than during it. This separation makes possible a simple, low-cost, automated, self-contained, and internally-clean "desktop factory" that can be installed almost anywhere to fabricate 3D structures, leaving any required clean room processes, such as photolithography to be performed by service bureaus or the like.

An example of the electrochemical fabrication process discussed above is illustrated in FIGS. 2A-2F. These figures show that the process involves deposition of a first material 2 which is a sacrificial material and a second material 4 which is a structural material. The CC mask 8, in this example, includes a patterned conformable material (e.g. an elastomeric dielectric material) 10 and a support 12 which is made from deposition material 2. The conformal portion of the CC mask is pressed against substrate 6 with a plating solution 14 located within the openings 16 in the conformable material 10. An electric current, from power supply 18, is then passed through the plating solution 14 via (a) support 12 which doubles as an anode and (b) substrate 6 which doubles as a cathode. FIG. 2A illustrates that the passing of current causes material 2 within the plating solution and material 2 from the anode 12 to be selectively transferred to and plated on the substrate 6. After electroplating the first deposition material 2 onto the substrate 6 using CC mask 8, the CC mask 8 is removed as shown in FIG. 2B. FIG. 2C depicts the second deposition material 4 as having been blanket-deposited (i.e. non-selectively deposited) over the previously deposited first deposition material 2 as well as over the other portions of the substrate 6. The blanket deposition occurs by electroplating from an anode (not shown), composed of the second material, through an appropriate plating solution (not shown), and to the cathode/substrate 6. The entire two-material layer is then planarized to achieve precise thickness and flatness as shown in FIG. 2D. After repetition of this process for all layers, the multi-layer structure 20 formed of the second material 4 (i.e. structural material) is embedded in first material 2 (i.e. sacrificial material) as shown in FIG. 2E. The embedded structure is etched to yield the desired device, i.e. structure 20, as shown in FIG. 2F.

Various components of an exemplary manual electrochemical fabrication system 32 are shown in FIGS. 3A-3C. The system 32 consists of several subsystems 34, 36, 38, and 40. The substrate holding subsystem 34 is depicted in the upper portions of each of FIGS. 3A-3C and includes several components: (1) a carrier 48, (2) a metal substrate 6 onto which the layers are deposited, and (3) a linear slide 42 capable of moving the substrate 6 up and down relative to the carrier 48 in response to drive force from actuator 44. Subsystem 34 also includes an indicator 46 for measuring differences in vertical position of the substrate which may be used in setting or determining layer thicknesses and/or deposition thicknesses. The subsystem 34 further includes feet 68 for carrier 48 which can be precisely mounted on subsystem 36.

The CC mask subsystem 36 shown in the lower portion of FIG. 3A includes several components: (1) a CC mask 8 that is actually made up of a number of CC masks (i.e. submasks) that share a common support/anode 12, (2) precision X-stage 54, (3) precision Y-stage 56, (4) frame 72 on which the feet 68 of subsystem 34 can mount, and (5) a tank 58 for containing the electrolyte 16. Subsystems 34 and 36 also include appropriate electrical connections (not shown) for connecting to an appropriate power source (not shown) for driving the CC masking process.

The blanket deposition subsystem 38 is shown in the lower portion of FIG. 3B and includes several components: (1) an anode 62, (2) an electrolyte tank 64 for holding plating solution 66, and (3) frame 74 on which feet 68 of subsystem 34 may sit. Subsystem 38 also includes appropriate electrical connections (not shown) for connecting the anode to an appropriate power supply (not shown) for driving the blanket deposition process.

The planarization subsystem 40 is shown in the lower portion of FIG. 3C and includes a lapping plate 52 and associated motion and control systems (not shown) for planarizing the depositions.

In addition to teaching the use of CC masks for electrodeposition purposes, the '630 patent also teaches that the CC masks may be placed against a substrate with the polarity of the voltage reversed and material may thereby be selectively removed from the substrate. It indicates that such removal processes can be used to selectively etch, engrave, and polish a substrate, e.g., a plaque.

The '630 patent further indicates that the electroplating methods and articles disclosed therein allow fabrication of devices from thin layers of materials such as, e.g., metals, polymers, ceramics, and semiconductor materials. It further indicates that although the electroplating embodiments described therein have been described with respect to the use of two metals, a variety of materials, e.g., polymers, ceramics and semiconductor materials, and any number of metals can be deposited either by the electroplating methods therein, or in separate processes that occur throughout the electroplating method. It indicates that a thin plating base can be deposited, e.g., by sputtering, over a deposit that is insufficiently conductive (e.g., an insulating layer) so as to enable subsequent electroplating. It also indicates that multiple support materials (i.e. sacrificial materials) can be included in the electroplated element allowing selective removal of the support materials.

The '630 patent additionally teaches that the electroplating methods disclosed therein can be used to manufacture elements having complex microstructure and close tolerances between parts. An example is given with the aid of FIGS. 14A-14E of that patent. In the example, elements having parts that fit with close tolerances, e.g., having gaps between about 1-5 um, including electroplating the parts of the device in an unassembled, preferably pre-aligned, state and once fabricated. In such embodiments, the individual parts can be moved into operational relation with each other or they can simply fall together. Once together the separate parts may be retained by clips or the like.

Another method for forming microstructures from electroplated metals (i.e. using electrochemical fabrication techniques) is taught in U.S. Pat. No. 5,190,637 to Henry Guckel, entitled "Formation of Microstructures by Multiple Level Deep X-ray Lithography with Sacrificial Metal layers". This patent teaches the formation of metal structure utilizing mask exposures. A first layer of a primary metal is electroplated onto an exposed plating base to fill a void in a photoresist, the photoresist is then removed and a secondary metal is electroplated over the first layer and over the plating base. The exposed surface of the secondary metal is then machined down to a height which exposes the first metal to produce a flat uniform surface extending across the both the primary and secondary metals. Formation of a second layer may then begin by applying a photoresist layer over the first layer and then repeating the process used to produce the first layer. The process is then repeated until the entire structure is formed and the secondary metal is removed by etching. The photoresist is formed over the plating base or previous layer by casting and the voids in the photoresist are formed by exposure of the photoresist through a patterned mask via X-rays or UV radiation.

The '637 patent teaches the locating of a plating base onto a substrate in preparation for electroplating materials onto the substrate. The plating base is indicated as typically involving the use of a sputtered film of an adhesive metal, such as chromium or titanium, and then a sputtered film of the metal that is to be plated. It is also taught that the plating base may be applied over an initial sacrificial layer of material on the substrate so that the structure and substrate may be detached if desired. In such cases after formation of the structure the plating base may be patterned and removed from around the structure and then the sacrificial layer under the plating base may be dissolved to free the structure. Substrate materials mentioned in the '637 patent include silicon, glass, metals, and silicon with protected processed semiconductor devices. A specific example of a plating base includes about 150 angstroms of titanium and about 300 angstroms of nickel, both of which are sputtered at a temperature of 160° C. In another example it is indicated that the plating base may consist of 150 angstroms of titanium and 150 angstroms of nickel where both are applied by sputtering.

SUMMARY OF THE INVENTION

It is an object of some embodiments of the invention to provide improved microscale or mesoscale devices (e.g. a turbines) having a linear or rotational element whose motion is confined by roller bearings or bushings.

It is an object of some embodiments of the invention to provide improved microscale or mesoscale device designs that use roller bearing or bushing to confine the rotational of linear motion of the device It is an object of some embodiments of the invention to provide microstructures or devices that have bushing designs or configurations that achieve a desired rotational clearance via a translation of at least two components relative to one another along the axis of rotation of the components.

It is an object of some embodiments of the invention to provide microstructures or devices that have bushing designs or configurations that achieve a desired rotational clearance via protrusions that extend from opposing faces of components but which are offset from one another along the axis of rotation.

It is an object of some embodiments of the invention to provide microstructures or devices that have bearing designs or configurations that achieve a desired rotational clearance via a translation of at least two components relative to one another along the axis of rotation of the components.

It is an object of some embodiments of the invention to provide microstructures or devices that have bearing designs or configurations that achieve a desired rotational clearance via protrusions that extend from opposing faces of components but which are offset from one another along the axis of rotation.

It is an object of some embodiments of the invention to provide microstructures or devices that have bearing designs or configurations that achieve a desired clearance during translation of at least two components relative to one another when translated linearly.

It is an object of some embodiments of the invention to provide microstructures or devices that have bearing designs or configurations that achieve a desired clearance during translation of at least two components relative to one another via protrusions that extend from opposing faces of components but which are offset from one another along an axis which is perpendicular to the axis of linear motion and which is perpendicular to a direction of clearance.

It is an object of some embodiments of the invention to provide microstructures or devices that have components that rotate relative to one another but which have an effective clearance that is smaller than a minimum feature or gap size that is allowed on a each individual layer during the formation of a multi-layer device.

Other objects and advantages of various embodiments of the invention will be apparent to those of skill in the art upon review of the teachings herein. The various embodiments of the invention, set forth explicitly herein or otherwise ascertained from the teachings herein, may address one or more of the above objects alone or in combination, or alternatively may address some other object of the invention ascertained from the teachings herein. It is not necessarily intended that all objects be addressed by any single aspect of the invention even though that may be the case with regard to some aspects.

A first aspect of the invention provides a microscale or mesoscale fabrication process for producing a three-dimensional structure, including at least one structural material, from a plurality of adhered layers, comprising at least one structural material and at least one sacrificial material, the process including: (A) forming a first layer by depositing at least one structural material and at least one sacrificial material and planarizing at least one of the deposited materials to produce a planarized layer having a desired lower boundary level and a desired upper boundary level; (B) forming a plurality of layers such that each successive layer is formed adjacent to and adhered to a previously formed layer, wherein said forming comprises repeating (A) multiple times; (C) after formation of a plurality of layers, separating at least one sacrificial material from the at least one structural material such that two components of the structure can move relative to one another, wherein each of the two components have at least one surface that opposes a surface of the other component wherein at least one of the opposing surfaces includes a plurality of protrusions and the other opposing surface include at least one protrusion, and wherein opposing protrusions were formed on different layers, wherein a lateral displacement between neighboring opposing protrusions is less than a minimum feature size for a gap in structural material on a single layer; (D) vertically displacing the two components such that one of the plurality of protrusions is shifted relative to the at least one protrusions so that they at least partially align in along an axis of layer formation; and (E) after said displacing, putting the structure to use including rotate or translating the two components relative to one another along a path that is perpendicular to the axis of layer formation.

A second aspect of the invention provides a microscale or mesoscale fabrication process for producing a three-dimensional structure, comprising at least one structural material, from a plurality of adhered layers, including at least one structural material and at least one sacrificial material, the process including: (A) forming a first layer by depositing at least one structural material and at least one sacrificial material and planarizing at least one of the deposited materials to produce a planarized layer having a desired lower boundary level and a desired upper boundary level; (B) forming a plurality of layers such that each successive layer is formed adjacent to and adhered to a previously formed layer, wherein said forming comprises repeating (A) multiple times; (C) after formation of a plurality of layers, separating at least one sacrificial material from the at least one structural material such that two components of the structure can move relative to one another, wherein each of the two components have at least one surface that opposes a surface of the other component wherein at least one of the opposing surfaces includes a plurality of protrusions and the other opposing surface include at least one protrusion, and wherein opposing protrusions were formed on immediately succeeding layers, wherein a lateral displacement between neighboring opposing protrusions is less than a minimum feature size for a gap in structural material on a single layer; and (D) putting the structure to use including rotating or translating the two components relative to one another along a path that is perpendicular to the axis of layer formation wherein the lateral displacement confines the rotation or linear motion.

A third aspect of the invention provides a microscale or mesoscale fabrication process for producing a three-dimensional structure, comprising at least one structural material, from a plurality of adhered layers, including at least one structural material and at least one sacrificial material, the process including: (A) forming a first layer by depositing at least one structural material and at least one sacrificial material and planarizing at least one of the deposited materials to produce a planarized layer having a desired lower boundary level and a desired upper boundary level; (B) forming a plurality of layers such that each successive layer is formed adjacent to and adhered to a previously formed layer, wherein said forming comprises repeating (A) multiple times; (C) after formation of a plurality of layers, separating at least one sacrificial material from the at least one structural material such that two components of the structure can move relative to one another, wherein each of the two components have at least one surface that opposes a surface of the other component wherein at least one of the opposing surfaces includes a plurality of protrusions and the other opposing surface include at least one protrusion, wherein a lateral displacement between neighboring opposing protrusions is greater than a minimum feature size for a gap in structural material on a single layer; (D) displacing the two components laterally such that one of the plurality of protrusions is shifted relative to the at least one protrusions so that they at least partially align in along a lateral direction and such that the gap between the displaced protrusions is less than the minimum feature size; and (E) after said displacing, putting the structure to use including rotating or translating the two components relative to one another such that the gap achieved via the displacement confines the motion of the two components.

A fourth aspect of the invention provides a microscale or mesoscale device, comprising one or more of: (a) a turbine having an impeller, a shaft, and a bore formed from a plurality of adhered layers with an axial orientation perpendicular to a plane of the layers, where the bore and shaft have an effective radial spacing at a given axial level which is smaller within than that of a radial spacing allowed during the formation of the layer corresponding to the given axial level; or (b) a turbine having an impeller, at least one pair of races and a plurality of rollers formed from a plurality of adhered layers with an axial orientation perpendicular to a plane of the layers where the races and rollers have an effective radial spacing at a given axial level smaller within than that allowed during the formation of the layer corresponding to the given axial level; or (c) a linear translator having a beam, at least one pair of races and a plurality of rollers formed from a plurality of adhered layers with an axial orientation perpendicular to a plane of the layers where the races and rollers have an effective radial spacing at a given axial level smaller within than that allowed during the formation of the layer corresponding to the given axial level; or (d) a bearing having at least one pair of races and a plurality of rollers formed from a plurality of adhered layers with an axial orientation perpendicular to a plane of the layers where the races and rollers have an effective radial spacing at a given axial level smaller within than that allowed during the formation of the layer corresponding to the given axial level; or (e) a bushing having at least one shaft and at least one bore formed from a plurality of adhered layers with an axial orientation perpendicular to a plane of the layers where the spacing between components of the bushing have an effective radial spacing at a given axial level smaller within than that allowed during the formation of the layer corresponding to the given axial level.

A fifth aspect of the invention provides a method for forming a micro-scale or mesoscale structure from a plurality of adhered layers, including one or more of: (a) a turbine, a bearing, or a linear translator formed from a plurality of operations implemented during the formation of each of at least plurality of layers; (b) a turbine, a bearing, or a linear translator formed using at least one electrodeposition operation and a planarization operation performed during the formation of each of a plurality of layers.

Further aspects of the invention will be understood by those of skill in the art upon reviewing the teachings herein. Other aspects of the invention may involve apparatus that can be used in implementing a process aspect of the invention as set forth above or they may involve a process or apparatus for forming a device aspect of the invention as set forth above. These other aspects of the invention may provide various combinations of the aspects, embodiments, and associated alternatives explicitly set forth herein as well as provide other configurations, structures, functional relationships, and processes that have not been specifically set forth above.

DETAILED DESCRIPTION

FIGS. 1A-1G, 2A-2F, and 3A-3C illustrate various features of one form of electrochemical fabrication that are known. Other electrochemical fabrication techniques are set forth in the '630 patent referenced above, in the various previously incorporated publications, in various other patents and patent applications incorporated herein by reference, still others may be derived from combinations of various approaches described in these publications, patents, and applications, or are otherwise known or ascertainable by those of skill in the art from the teachings set forth herein. All of these techniques may be combined with those of the various embodiments of various aspects of the invention to yield enhanced embodiments. Still other embodiments may be derived from combinations of the various embodiments explicitly set forth herein.

Figure 1A:
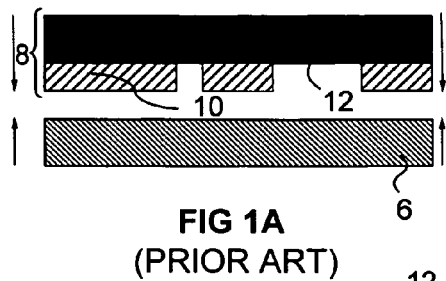
FIGS. 1A-1C schematically depict side views of various stages of a CC mask plating process, while FIGS. 1D-G schematically depict a side views of various stages of a CC mask plating process using a different type of CC mask.
Figure 1B:
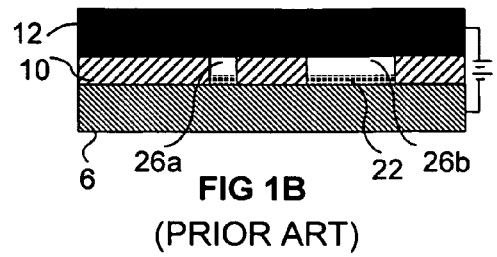
Figure 1C:
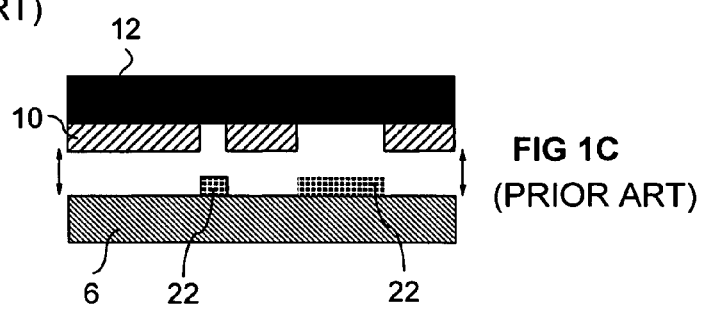
Figure 1D:
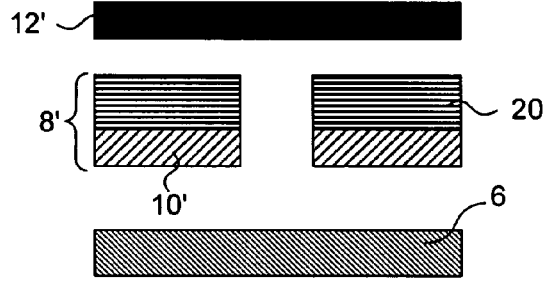
Figure 1E:
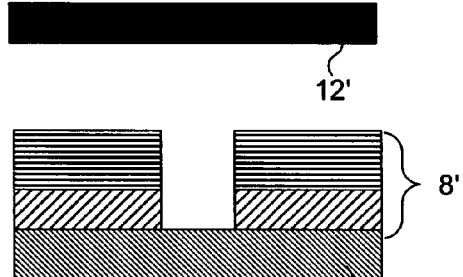
Figure 1F:
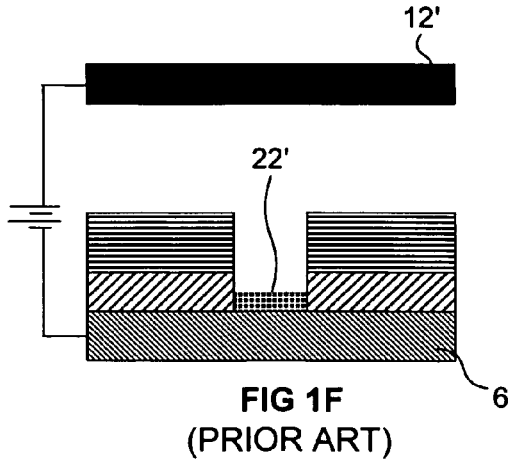
Figure 1G:
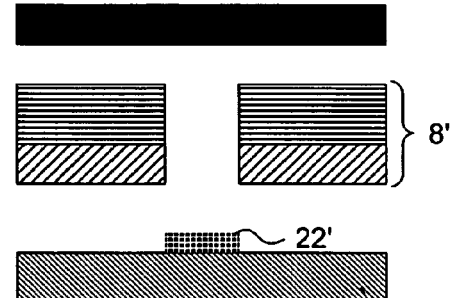
Figure 2A:
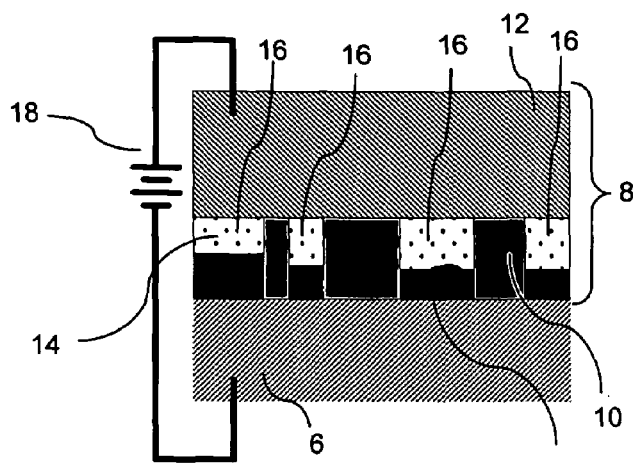
FIGS. 2A-2F schematically depict side views of various stages of an electrochemical fabrication process as applied to the formation of a particular structure where a sacrificial material is selectively deposited while a structural material is blanket deposited.
Figure 2B:
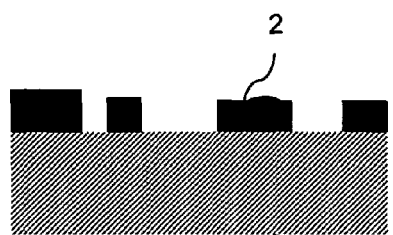
Figure 2C:
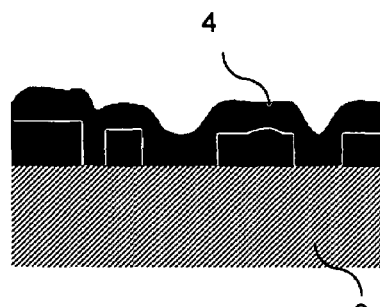
Figure 2D:
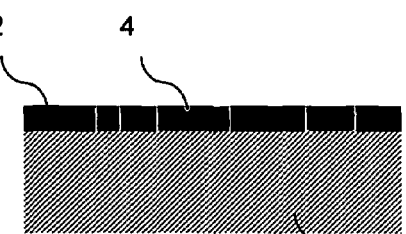
Figure 2E:
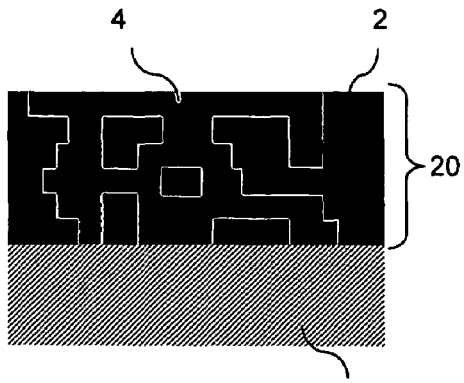
Figure 2F:
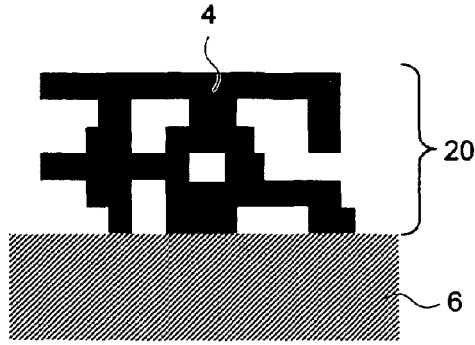
Figure 3A:
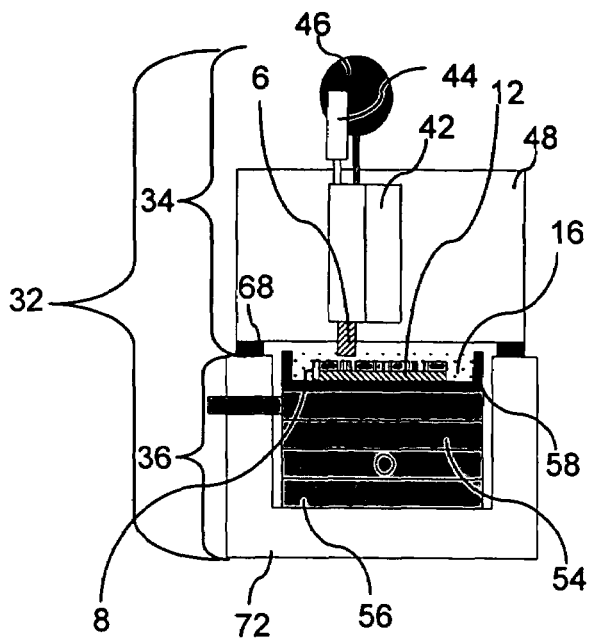
FIGS. 3A-3C schematically depict side views of various example subassemblies that may be used in manually implementing the electrochemical fabrication method depicted in FIGS. 2A-2F.
Figure 3B:
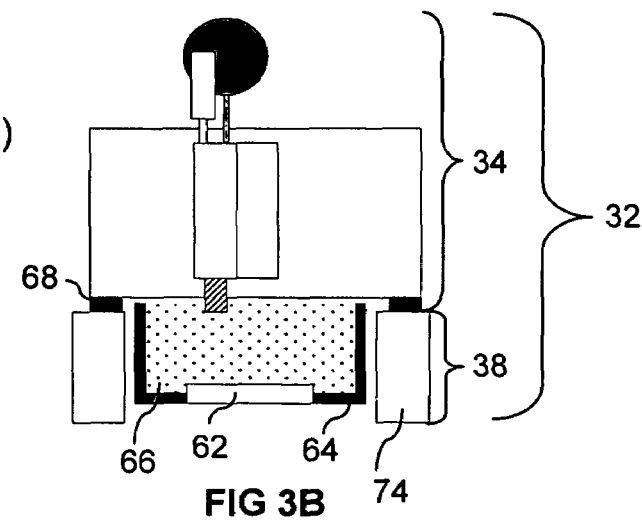
Figure 3C:
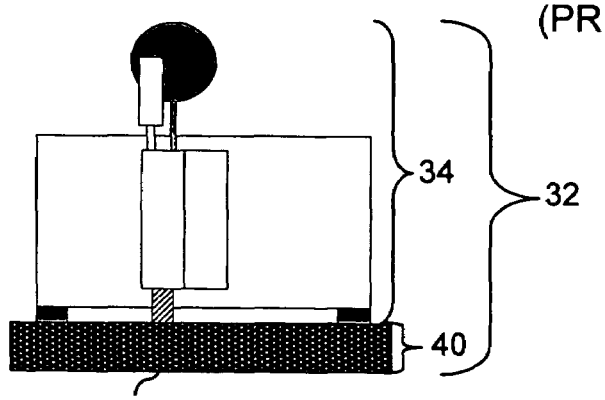
Figure 4A:
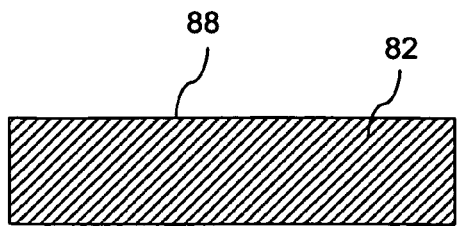
FIGS. 4A-4F schematically depict the formation of a first layer of a structure using adhered mask plating where the blanket deposition of a second material overlays both the openings between deposition locations of a first material and the first material itself
Figure 4B:
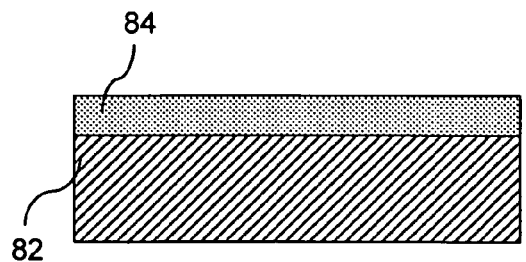
Figure 4C:
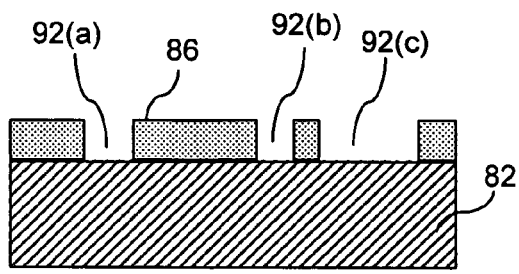
Figure 4D:
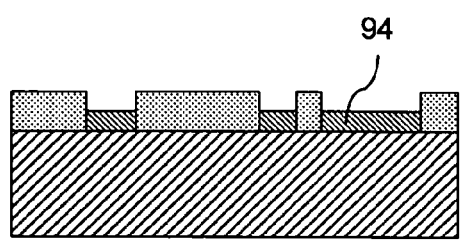
Figure 4E:
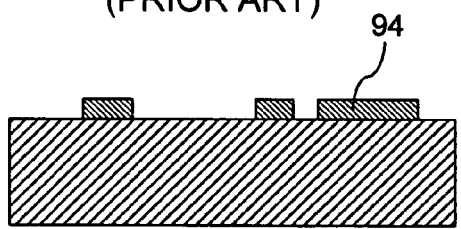
Figure 4F:
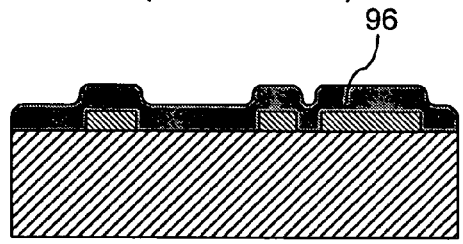
Figure 4G:
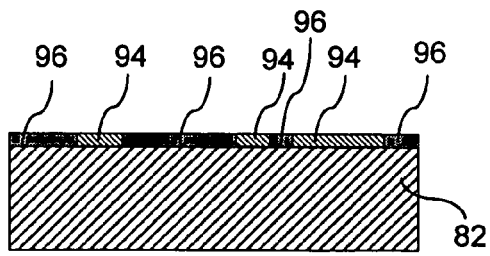
FIG. 4G depicts the completion of formation of the first layer resulting from planarizing the deposited materials to a desired level.
Figure 4H:
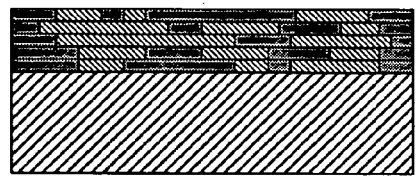
FIGS. 4H and 4I respectively depict the state of the process after formation of the multiple layers of the structure and after release of the structure from the sacrificial material.
Figure 4I:
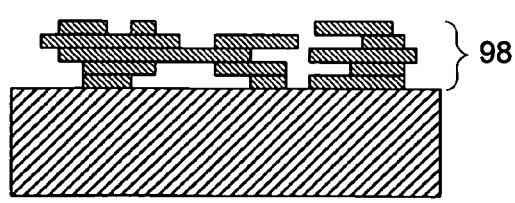

FIGS. 4A-4I illustrate various stages in the formation of a single layer of a multi-layer fabrication process where a second metal is deposited on a first metal as well as in openings in the first metal so that the first and second metal form part of the layer. In FIG. 4A a side view of a substrate 82 is shown, onto which patternable photoresist 84 is cast as shown in FIG. 4B. In FIG. 4C, a pattern of resist is shown that results from the curing, exposing, and developing of the resist. The patterning of the photoresist 84 results in openings or apertures 92(a)-92(c) extending from a surface 86 of the photoresist through the thickness of the photoresist to surface 88 of the substrate 82. In FIG. 4D a metal 94 (e.g. nickel) is shown as having been electroplated into the openings 92(a)-92(c). In FIG. 4E the photoresist has been removed (i.e. chemically stripped) from the substrate to expose regions of the substrate 82 which are not covered with the first metal 94. In FIG. 4F a second metal 96 (e.g. silver) is shown as having been blanket electroplated over the entire exposed portions of the substrate 82 (which is conductive) and over the first metal 94 (which is also conductive). FIG. 4G depicts the completed first layer of the structure which has resulted from the planarization of the first and second metals down to a height that exposes the first metal and sets a thickness for the first layer. In FIG. 4H the result of repeating the process steps shown in FIGS. 4B-4G several times to form a multi-layer structure are shown where each layer consists of two materials. For most applications, one of these materials is removed as shown in FIG. 4I to yield a desired 3-D structure 98 (e.g. component or device).

Various embodiments of various aspects of the invention are directed to formation of three-dimensional structures from materials some of which may be electrodeposited or electroless deposited. Some of these structures may be formed form a single layer of one or more deposited material while others are formed from a plurality of layers each including at least two materials (e.g. 2 or more layers, more preferably five or more layers, and most preferably ten or more layers). In some embodiments structures having features positioned with micron level precision and minimum features size on the order of tens of microns are to be formed. In other embodiments structures with less precise feature placement and/or larger minimum features may be formed. In still other embodiments, higher precision and smaller minimum feature sizes may be desirable.

The various embodiments, alternatives, and techniques disclosed herein may form multi-layer structures using a single patterning technique on all layers or using different patterning techniques on different layers. For example, Various embodiments of the invention may perform selective patterning operations using conformable contact masks and masking operations (i.e. operations that use masks which are contacted to but not adhered to a substrate), proximity masks and masking operations (i.e. operations that use masks that at least partially selectively shield a substrate by their proximity to the substrate even if contact is not made), non-conformable masks and masking operations (i.e. masks and operations based on masks whose contact surfaces are not significantly conformable), and/or adhered masks and masking operations (masks and operations that use masks that are adhered to a substrate onto which selective deposition or etching is to occur as opposed to only being contacted to it). Adhered mask may be formed in a number of ways including (1) by application of a photoresist, selective exposure of the photoresist, and then development of the photoresist, (2) selective transfer of pre-patterned masking material, and/or (3) direct formation of masks from computer controlled depositions of material.

Patterning operations may be used in selectively depositing material and/or may be used in the selective etching of material. Selectively etched regions may be selectively filled in or filled in via blanket deposition, or the like, with a different desired material. In some embodiments, the layer-by-layer build up may involve the simultaneous formation of portions of multiple layers. In some embodiments, depositions made in association with some layer levels may result in depositions to regions associated with other layer levels. Such use of selective etching and interlaced material deposited in association with multiple layers is described in U.S. patent application Ser. No. 10/434,519, by Smalley, and entitled "Methods of and Apparatus for Electrochemically Fabricating Structures Via Interlaced Layers or Via Selective Etching and Filling of Voids layer elements" which is hereby incorporated herein by reference as if set forth in full.

In the present application the term bushing is used to describe a shaft and bore pair that rotate relative to one another without a roller bearing providing stabilized motion. In some embodiments, the bushing may include an axle and a structure or device having a hole through it which accepts the axle and allows relative rotation of the structure and axle along a path that is perpendicular to the length of the axle. In some embodiments, an intermediate structure of a selected material may be formed or inserted between the axle and paired structure to provide a desired clearance, reduced friction, wear resistance, or other desired property.

In the present application vertical offsetting refers to offsetting or shifting that occurs along the direction perpendicular to the plane of the layers from which a structure is formed regardless of the physical orientation of the structure during formation or offsetting.

Figure 5A:
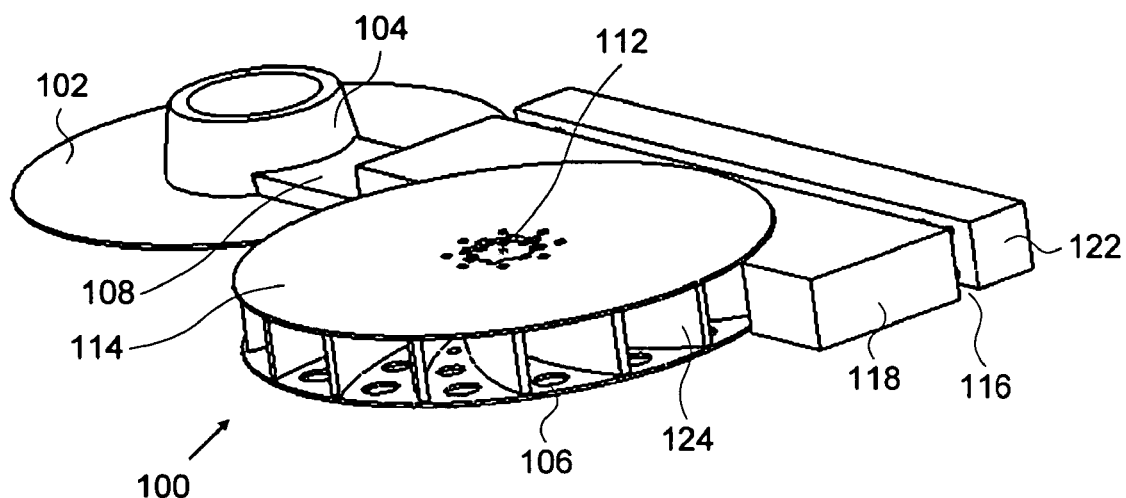
FIGS. 5A-5B provide a perspective view of a micro-turbine with a bushing with 5B depicting a cross-sectioned perspective view.

FIG. 5A provides a perspective view of a micro-turbine 100 with a bushing. Pressurized air (preferably dry, or other gas such as nitrogen) is supplied to the inlet port 104, which may sit on a large base 102 (as shown) to increase the area of contact with a substrate and thus improve adhesion of the device to the substrate. Air may be coupled to the port using a flexible tube (e.g., silicone) whose open end is pushed against the port, inserted into the port, or slid over the outer perimeter of the port. Air is then conducted by a manifold 108 to a shroud 118 which partially surrounds an impeller 114 which is free to turn on a bushing, i.e. bore and shaft 112. The shroud 118 is a largely-hollow box that forces air to escape only by pushing on the vanes 124 of the impeller 114, which may be curved as shown in the figure. Impeller 114 may have openings 106 which may aid in releasing the structure from a sacrificial material and/or from a sacrificial substrate or may be useful in directing air flow in desired directions. The shroud 118, as-fabricated, may include a gap 116 to facilitate release of sacrificial material from its interior. This gap 116 is closed up prior to use of the device as will be described later. In alternative embodiments gaps may exist in other portions of the shroud or manifold to allow release of sacrificial material, which gaps may then be closed prior to putting the device to use. For example the bottom side of the manifold may include openings which may be sealed by bonding the bottom sides of the manifold to a substrate (e.g. upon transfer from one substrate to another as taught in U.S. patent application Ser. No. 10/841,006, by Thompson, et al., filed May 7, 2004, and entitled "Electrochemically Fabricated Structures Having Dielectric or Active Bases and Methods of and Apparatus for Producing Such Structures", and by U.S. patent application Ser. No. 11/028,958, by Kumar, et al., filed Jan. 3, 2005, and entitled "Probe Arrays and Method for Making", which are both hereby incorporated herein by reference.

In some embodiments, the shroud may be formed without a lid or with a lid that is spaced from its desired position by the presence of sacrificial material and after removal of the sacrificial material the lid may be slid, rotated, lowered or otherwise moved into position. In some alternatives the lid may be fitted into place via alignment elements on the lid and on the body portion of the shroud, it may be fixed in position via clips or other retention elements that are formed with the shroud and/or lid, the lid and body of the shroud may be sealed together using an adhesive, solder or other appropriate material.

Examples of releasing, alignment, and retention processes and elements that may be used in conjunction with some alternative embodiments of the invention are found in the following U.S. Patent Applications: (1) U.S. patent application Ser. No. 10/434,103, filed May 7, 2003 by Cohen et al., and entitled "Electrochemically Fabricated Hermetically Sealed Microstructures and Methods of and Apparatus for Producing Such Structures"; (2) U.S. patent application Ser. No. 11/435,809, filed May 16, 2006 by Cohen et al., and entitled "Electrochemically Fabricated Hermetically Sealed Microstructures and Methods of and Apparatus for Producing Such Structures"; (3) U.S. patent application Ser. No. 60/709,614, filed Aug. 19, 2005 by Cohen et al., and entitled "Enhanced Electrochemical Fabrication Methods Including Assembly of Split Structures"; and (4) U.S. patent application Ser. No. 10/677,556, filed Oct. 1, 2003 by Cohen et al., and entitled "Monolithic Structures Including Alignment and/or Retention Fixtures In some embodiments of a turbine device or in embodiments of other rotary devices, it is possible to fabricate a bushing in a standard fashion. That is it is possible to fabricate the bushing (i.e. the bore and its associated shaft 112) from one or more layers with the shaft and bore having opposing uniformly spaced cylindrical surfaces with a cylindrical gap or clearance between them. During formation, this gap or clearance spaces the respective surfaces, in the plane of each layer, one from the other by no less than a minimum feature size dictated by the formation process and its implementation. As such, if the desired spacing is less than the minimum feature size in the plane of a layer, it is not possible to form the two elements together in their respective positions.

In such cases and in some embodiments, the bore may be formed separate from its axle or shaft and then the bushing assembled by translating the bore and its shaft relative to one another along the axis of layer build up by total height of the shorter of the two components (i.e. at least the total height of one or more clearance setting elements located on at least one of the shaft or the bore).

In some preferred embodiments, it is possible to form the bore and its shaft while the bushing is at least partially assembled (i.e. while the clearance setting elements of the shaft are interlaced with the clearance setting elements of the bore) while not violating the minimum feature size and other requirements of the fabrication process involved in forming each of the plurality of layers that form the shaft and bore. In these embodiments the surfaces of the shaft and bore do not form uniformly spaced cylindrical elements along their heights (i.e. along the layer stacking axis). Instead the shaft and bore are covered with projections that extend from vertically shifted layers such that the minimum feature size requirements are not violated during the formation of any particular layer. After layer formation and release of the structures or components from any sacrificial material, the shaft and bore are made to undergo a vertical shift (i.e. a shift along the axis of layer stacking) by an amount that is less than the overall height of the plurality of clearance setting elements so that clearance setting elements formed on different layers are brought into alignment with their counterpart elements on the opposite structure and so that desired clearance or tolerance spacing is achieved which is finer than the minimum feature size (i.e. the minimum feature size associated with regions of sacrificial material or with spacing between regions of structural material). In other words, by forming the opposing structures with surfaces containing projections on offset layers and then shifting the structures along the axis of layer stacking by an appropriate amount which is less than the overall height of the structures, the effective clearance obtainable is reduced below that dictated by the by minimum feature size. Some examples of this type of structural modification and offset layer formation technique are described in more detail in U.S. patent application No. 10/949,744, by Lockard, et al., filed Sep. 24, 2004, and entitled "Three-Dimensional Structures Having Feature Sizes Smaller Than a Minimum Feature Size and Methods for Fabricating", which is hereby incorporated herein by reference.

Figure 5B:
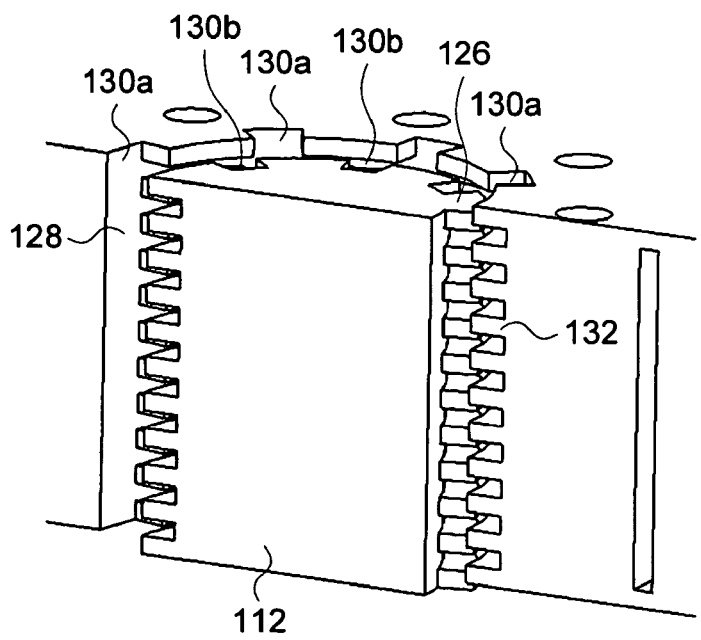

An example of such a bushing is provided in the cross-sectioned perspective view of FIG. 5B, which consists of a shaft 112 whose surface is covered with projections 126, and a bore 128 at the center of the impeller 114 also covered with projections 132. In some preferred embodiments, the projections should allow for release of any sacrificial material that is trapped between the shaft and bore. One way of achieving this is to give the projections a lobed shaped (i.e. the projections do not form complete cylindrical elements but instead form broken or discontinuous cylindrical elements) such that there are channels or breaks 130a and 130b through which release can occur. On each of the shaft and the bore the lobes may be vertically aligned or offset. In some embodiments, lobes need only exist in the projections on one of the shaft or the bore of the bushing. As formed, channels on the shaft and bore may be aligned to form larger channels. The lobe sizes are preferably made different for shaft and bore projections, to avoid the projections of the shaft from fitting into those of the bore. The sizes of the projections on each of the shaft and the bore may be changed from layer to layer. If is possible to have projections extend from each layer of the shaft and each layer of the bore but it is believed that easier release of sacrificial material will occur if projections do not occur on every layer. As designed and fabricated, the projections of the shaft and those of the bore of the impeller are on alternate layers (e.g., even-numbered layers for the projections on the shaft and odd numbered layers for projections and the bore). The clearance during layer fabrication between the outside diameter (OD) of the shaft projections and the inside diameter (ID) of the bore (ignoring the bore projections which are on different layers) is at least the minimum feature size. Similarly, the fabricated clearance between the ID of the bore projections and the OD of the shaft (ignoring the shaft projections where are on different layers) is also at least the minimum feature size. Projections can also be more than one layer thick, in which case a similar alternation may be achieved, for example, by defining shaft projections on layers 1 and 2, bore projections on layers 3 and 4, shaft projections on layers 5 and 6, etc.

In embodiments, where incomplete rotation of the shaft relative to the bore will occur during use, it may be possible to form the projections on the same layer of the shaft and the bore with the shaft and the bore rotationally located in non-interfering positions during formation and then rotated into the working rotational range with tighter shaft to bore clearances after release of sacrificial material.

When the device is in use, the impeller may move vertically slightly, dropping down by one projection thickness (here, one layer) such that the shaft and bore projections are now on the same layer, in opposition to one another. To allow for this, the projections are designed to have clearance between them of several microns (measured in the plane of the layers). In other words, the clearance (the 'effective clearance') between the OD of the shaft projection and the ID of the bore projection is on the order of several microns. In still other embodiments, the impeller may be made to rise relative to the shaft by one or more layer thicknesses during use. In some embodiments this rising may be limited by a cap on shaft 112 or by one or more layers of larger diameter on the shaft or of smaller diameter on the bore.

In some embodiments the rising may occur automatically by downwardly directed flow of a portion of the driving air or gas. In other embodiments, openings may exist in the upper portion of the impeller to allow some of the driving air or gas to escape upwardly and thus drive the impeller downward, during operation, toward the base. In some embodiments, the impeller may configured to make only limited contact with a cap or base so as to minimize friction or other binding mechanisms. The capping mechanism or other retention mechanism (e.g. one or more clips) may aid in inhibiting the impeller from being lost during release. Limited contact between rotating impellers and caps or bases may be achieved by use of small diameter standoffs near the rotational axis of the impeller, either on the impeller itself or on the base or cap. In other embodiments, limited contact may be implemented via the directing of air, other gas, of fluid through openings in the cap, base, and impeller to create an air bearing effect. In some embodiments it may be desirable to have equal or nearly equal volumes of fluid on both top and bottom caps or bases so that a desired centrally located rotation or movement can occur while in other embodiments it may be desirable to use unequal flows of material such that vertical shifting is allowed to occur in the direction away from the greater flow but so that pressure or forces equalize in a manner that allows a cushion of air to limit the amount of shifting while simultaneously providing an effective air bearing.

In some embodiments, instead of relying on vertical (i.e. axial offsets) to cause appropriate engagement of shaft and bore clearance elements, the bushings may function in an "interference" mode in which no vertical motion need occur. In this mode, the projections on shaft and bore prevent, and their tight vertical tolerances inhibit the shaft and bore from engaging or locking to one another unless radial load, as opposed to axial load or tangential load, is quite high). Such a binding of the shaft and the bore would require an interference fit between the projections on each and thus if tolerances can be maintained such fitting may be avoided. The EFAB process produces such tolerances automatically since, for example, the thickness of a shaft projection is virtually identical to the vertical distance between two neighboring bore projections by virtue of the planarization operations that occur during the formation of the structure (e.g. during the formation of each layer). Thus whether or not the impeller moves vertically (i.e. axially), the effective clearance, not the intra-layer fabricated clearance, is the operating clearance of the bushing, assuming the radial load is not great enough to force an interference fit between projections. It may generally be preferred for bore and shaft projections to be of the same thickness, but this is not strictly necessary. In some embodiments, the material used to form the shaft may be different from the material used to define the bore and if the operational temperature is different from the formation temperature, differential thermal expansion of the projections on the shaft or projections on the bore may lead to even more reliable operation as interference fitting will be made that much more difficult if not impossible.

In still other alternative embodiments, material forming shaft layers that do not contain projections may have a different coefficient of thermal expansion compared to shaft layers that do contain projections. In particular the layers containing projections may have a higher degree of thermal expansion. Similar, layers containing bore projections may be formed from a higher thermal expansion material than layers that do not contain bore projections. In some such alternative embodiments, as each overall layer containing bore and shaft portions, it may be necessary to form each layer from at least two different structural materials and at least one sacrificial material. In such embodiments, if the operation temperature is different from the formation temperature, thermal expansion may be adequate to ensure that interference fitting does not occur even under relative large lateral loads.

Figures 6A, 6B:
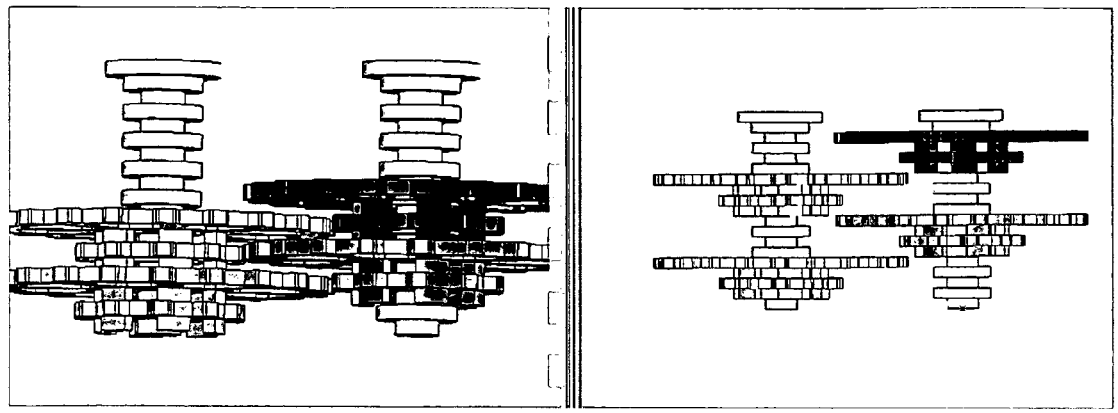
FIGS. 6A-6B show a gear train before and after self-assembly with vibration from an initial as-fabricated configuration.
Figure 7:
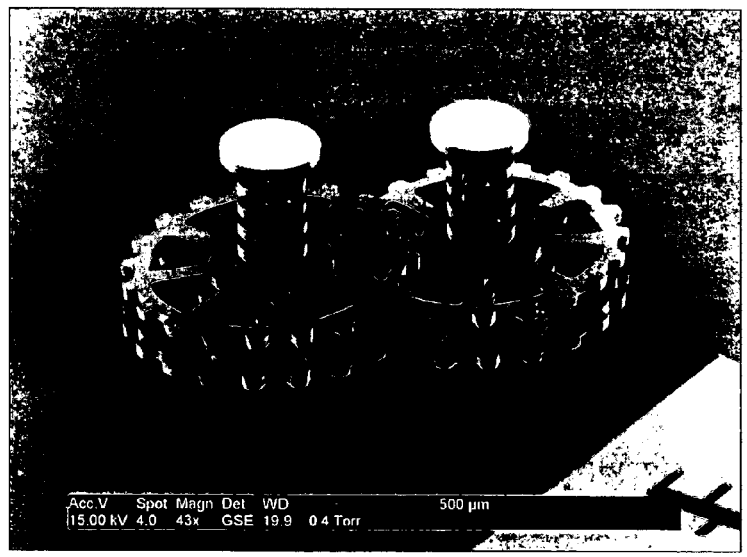
FIG. 7 shows a micrograph of the gear train.

FIGS. 6A-6B show a gear train which self-assembles with vibration from an initial as-fabricated configuration, thus again illustrating the vertical motion approach already discussed. FIG. 6A shows the gears after assembly while FIG. 6B shows the gears prior to assembly. The effective clearance (here, about 5 microns) is much less than the fabricated clearance (about 50 microns). FIG. 7 shows a micrograph of the gear train.

Figure 8A:
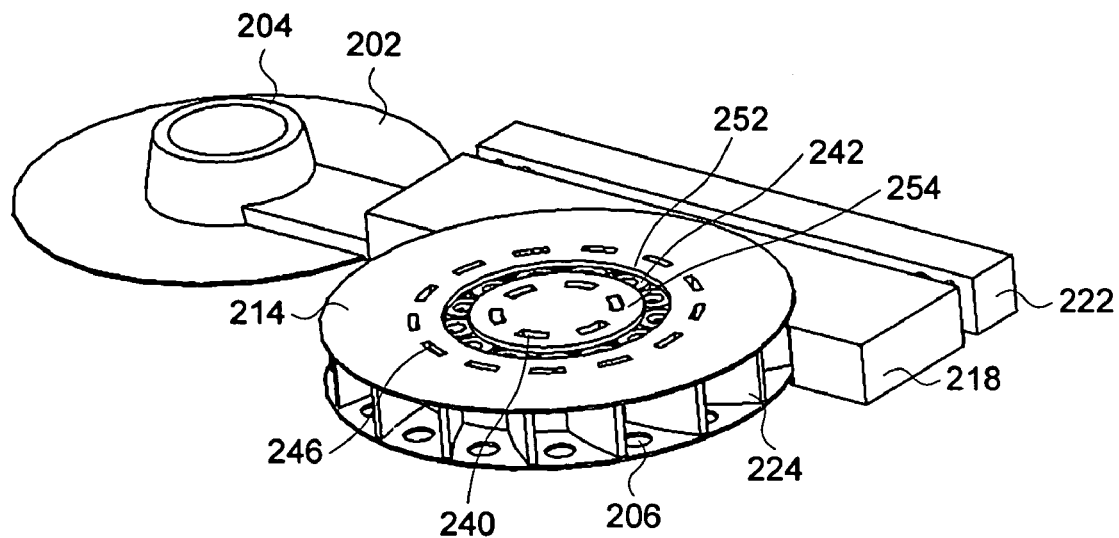
FIGS. 8A-8E show an alternative turbine embodiment using a roller bearing with FIG. 8E depicting a partially transparent bottom view of the turbine.
Figure 8B:
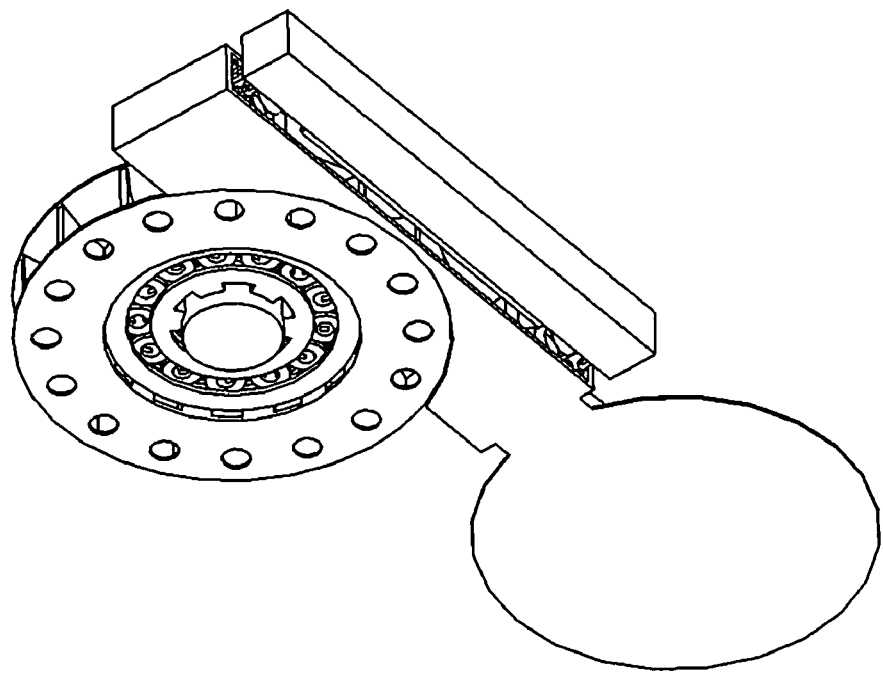
Figure 8C:
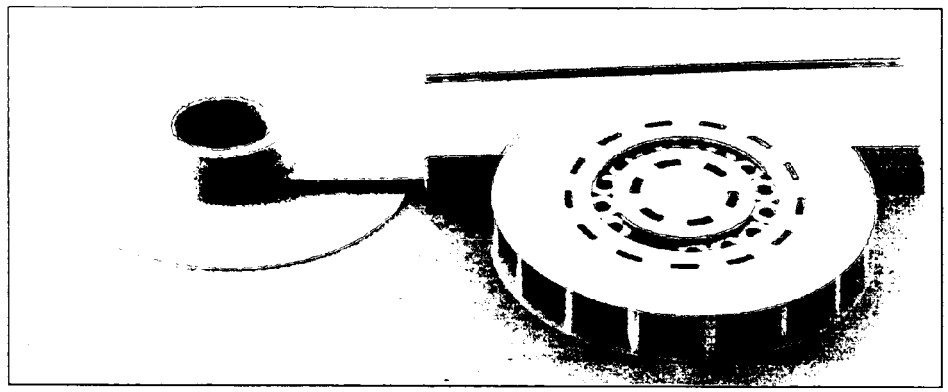
Figure 8D:
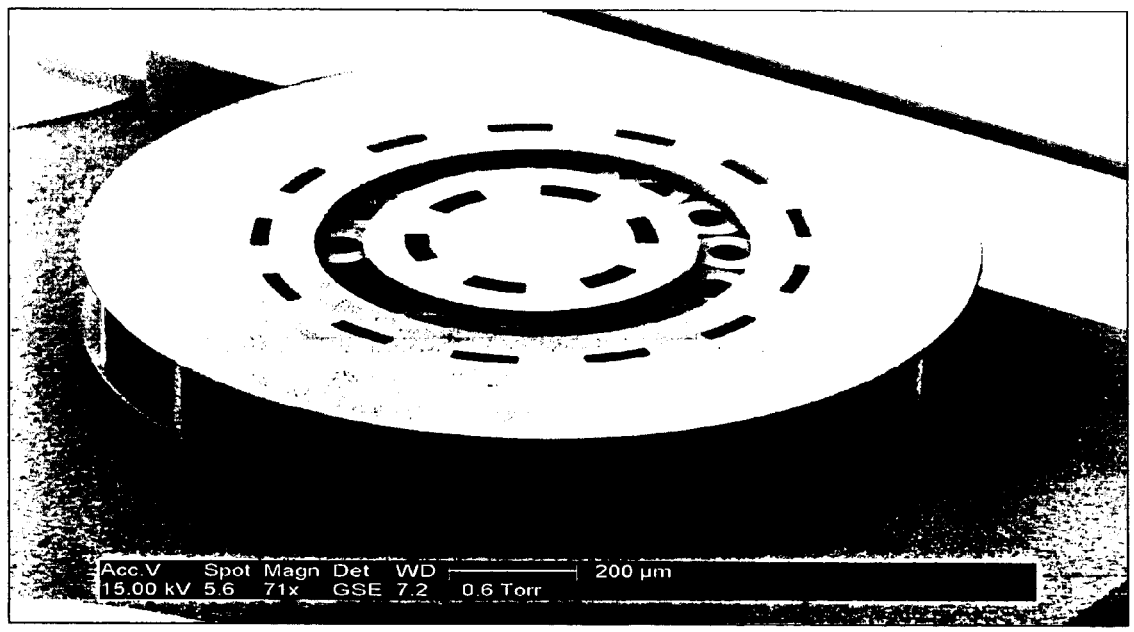

FIGS. 8A-8E show an alternative turbine embodiment using a roller bearing. The roller bearing is monolithically fabricated in the EFAB process, with rollers and all bearing surfaces in place. The bearings described here may be used for a variety of rotary (and linear) applications. It is possible to design a roller bearing that uses cylindrical rollers and races with flat sidewalls (e.g. sidewalls without projections); as with the bushing, however, the minimum clearance achievable would be no smaller than the minimum feature size in the layer plane. A preferred embodiment is thus to fabricate a roller bearing using projections such that the effective clearance can be small. While it is possible to design a roller bearing that requires vertical motion of the rollers with respect to the races, placing the projections in opposition as before, a preferred embodiment is to fabricate a roller bearing with projections that relies on interference and for which no relative vertical motion is needed. The turbine of FIGS. 8A-8E employs this bearing embodiment. FIGS. 8A and 8B provide perspective views showing the top and bottom of the turbine respectively while FIGS. 8C and 8D provide perspective micrograph views with different magnifications of the top of the turbine as fabricated using an electrochemical fabrication process based on an electrodeposited nickel (as the structural material) and electrodeposited copper (as a sacrificial material—which has been removed and is not shown). In the process the sacrificial material may be deposited first into openings in a masking material (photoresist in the form of an adhered mask), while structural material was deposited second and then the depositions planarized to complete formation of a layer. The process may be repeated to form the structure from a plurality of deposited layers of materials and then the sacrificial material may be removed. In other embodiments, other structural and sacrificial materials may be used and even different materials or even multiple structural materials used on individual layers. The order of depositing sacrificial and structural materials may also be varied.

Figure 8E:
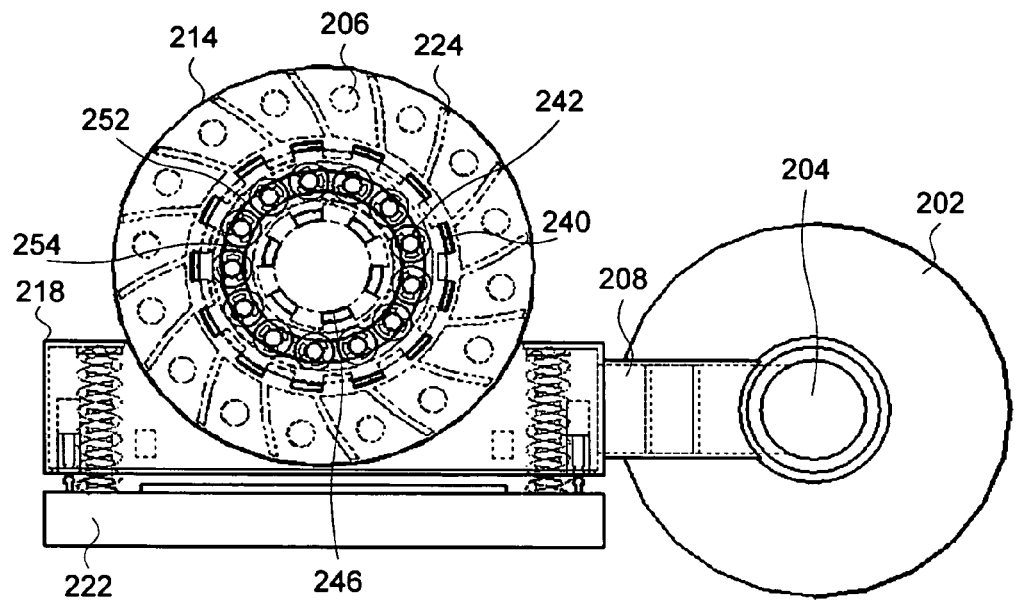

FIG. 8E provides a partially transparent bottom view of the turbine. In these figures various elements of the turbine may be seen including impeller 214, having openings 206 and 246 and blades or vanes 224 and having upper inner edge 252 which partially covers rollers 242. Inner race 226 may also be seen along with upper outer edge 254 which partially covers rollers 242 and acts to retain them. Openings 246 in inner race 226 may also be seen. Shroud 218, manifold 208, inlet port 204, and base 202 may also be seen.

Figures 9A, 9B:
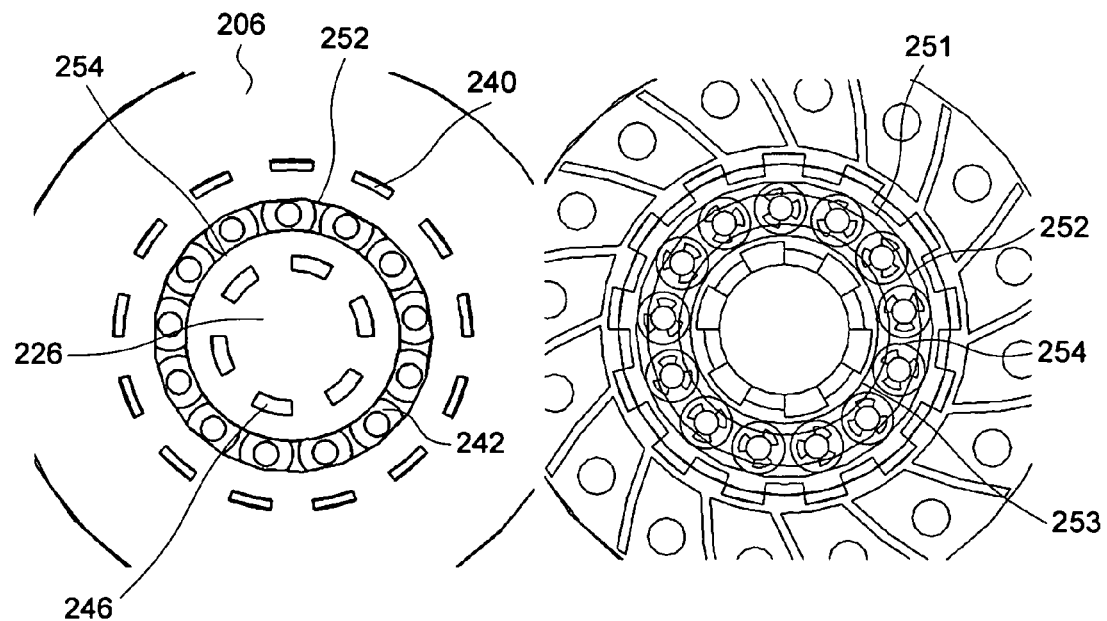
FIG. 9A depicts a turbine embodiment using a roller bearing and FIG. 9B depicts that turbine embodiment with a transparent view.

In alternative embodiments shroud 118 may angularly extend around the impeller a lesser or greater amount than shown. In some embodiments the shroud may extend completely around the impeller. In some embodiments, multiple inlets may be used to feed air into different portions of a divided shroud. In still other embodiments two separate inlets, manifolds and shrouds may be provided around the impeller, for example, one may be provided on each side of the impeller. Such an arrangement may have the advantage of providing a more balanced rotational force on the impeller As can be seen from FIGS. 8E, 9A and 9B, the rollers 242 are placed at equal distances around the OD 253 of the inner race 226 and the ID 251 of the outer race portion of impeller 224 and are partially covered by the outer edge 254 and inner edge 252. It may be desirable to minimize the spacing between the rollers 242, setting this to the minimum feature size in the layer plane, as has been done here. When the device is fabricated, as is shown in FIGS. 8C-8D, the rollers may tend to move in such a way as to produce uneven spacing; as long as the largest space thus produced is not excessively large, the bearing will remain adequately supported. Alternatively, one can provide a freely-moving, co-fabricated cage for the rollers that tends to keep them from clumping together. Such a cage may involve loose fitting shafts that penetrate into an opening located in the center of each roller.

Figure 10:
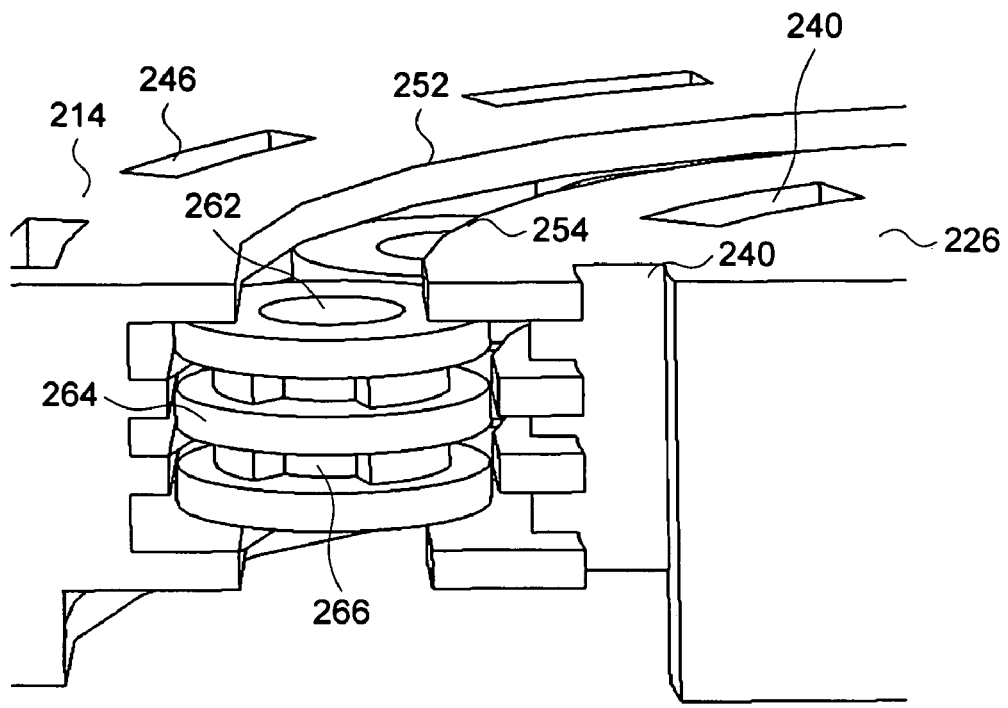
FIGS. 10 and 11 depict the rollers, the race, and the race portion of the impeller in which they roll and have projections or extended regions.
Figure 11:
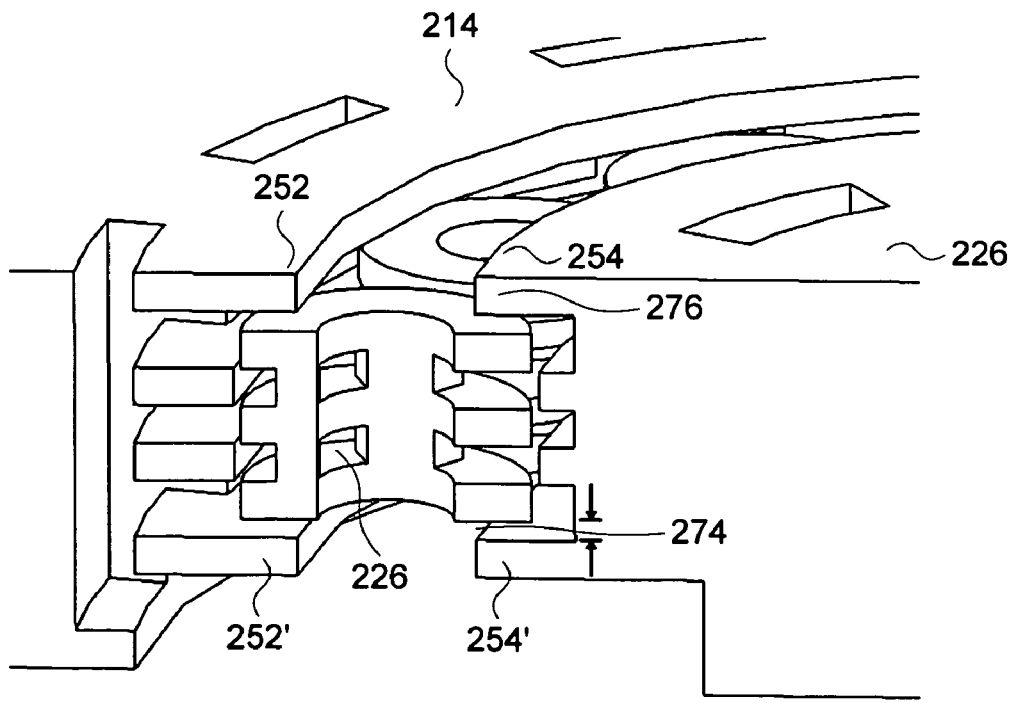

As can be seen in FIGS. 10 and 11, the rollers 242 and the race 226 and race portion of impeller 214 in which they roll have projections or extended regions, as with the bushings described earlier. However, here the projections are in the form of continuous surfaces that are not lobed. Release of sacrificial material is provided through windows and release holes, such as openings 240, 246 and the ring-shaped spacing between edges 252 and 254 via central openings 262 in rollers 242. The windows are openings in vertical surfaces between projections, located on the rollers and inner and outer races, while the release holes are openings (here continuous vertical channels, though they may be otherwise) in horizontal surfaces which communicate with the windows.

As shown in FIG. 10, the inner and outer races are provided with flanges or edges 252 and 254 and 252' and 254' to prevent the rollers from escaping. The axial gaps 274 and 276 between these flanges and the rollers should be small to minimize axial play in the bearing and tilting of the roller axis so as to limit the roller's ability to rotate out of a parallel orientation to the bearing axis, by specifying the thickness of the layers associated with the gaps to be small (e.g., 2-4 microns). Tilting of the roller axis may also be minimized by designing the roller to have a fairly high aspect ratio (height/OD). The flanges should sufficiently overlap the roller OD to prevent escape or binding, even when the roller tilts.

Both versions of turbine (bushing and roller bearing) have been tested successfully, with the impellers spinning at a speed that was not measured, but which was clearly substantial as the features on the impellers were blurred.

In the embodiments of FIGS. 5A-5B or FIGS. 8A-11 it is not necessary to allow axial direction shifting so that tighter fitting between bushings and or rollers and bearings can occur, instead it may be possible to allow the vertical tightness of the offset protruding elements to inhibit an interference fitting form occurring between inner and outer lobes or between inner and outer rings or between a combination of lobes and rings. In some alternative embodiments, the projections on the rollers 242 may exist on portions of the intermediate layers and particularly in those portions which are not facing the projections that extend from the inner race 226 and outer race portion of the impeller. The existence of such intermediate protrusion will not violate a minimum feature size restriction but will further inhibit an interference fit from occurs as the roller rotate along the races.

The approach to providing releasability in the embodiment of FIGS. 8A-11 may be used to provide release of sacrificial material in an alternative bushings' embodiment, in lieu of the lobed projections already described.

Figure 12:
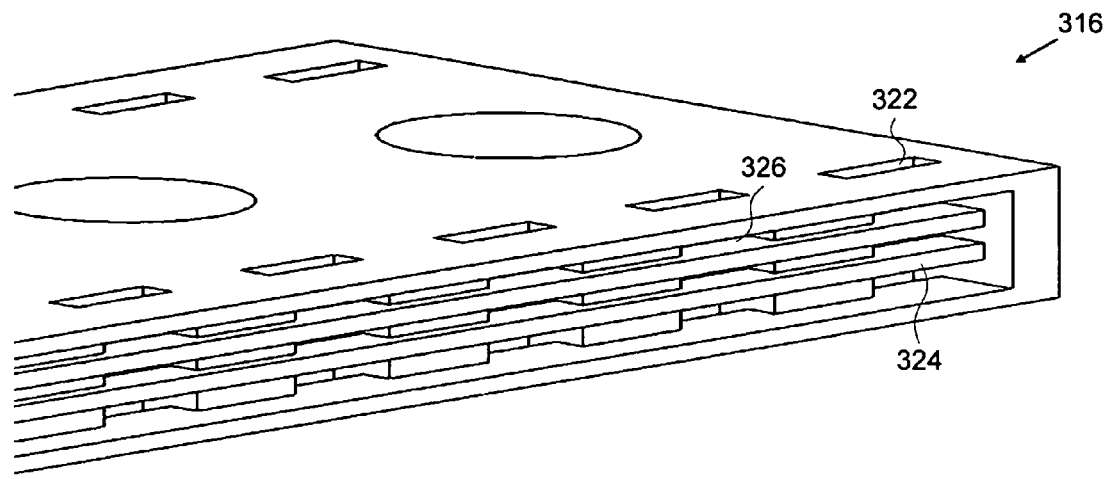
FIG. 12 provides a perspective view of a portion of translating beam showing release holes and windows.
Figure 13A:
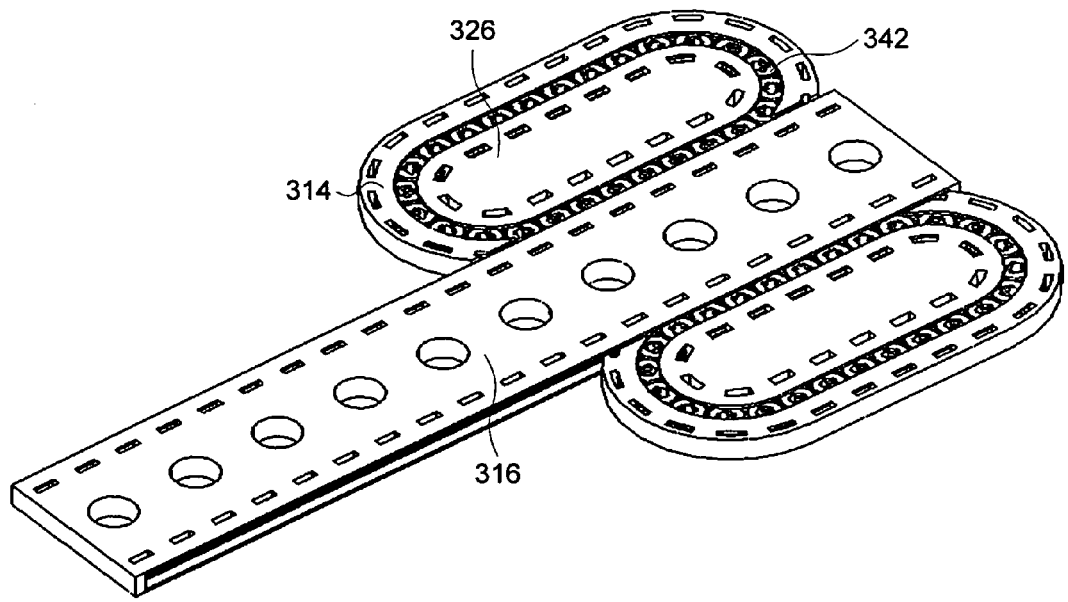
FIGS. 13A and 13B provide top and bottom perspective views of a linear bearing.
Figure 13B:
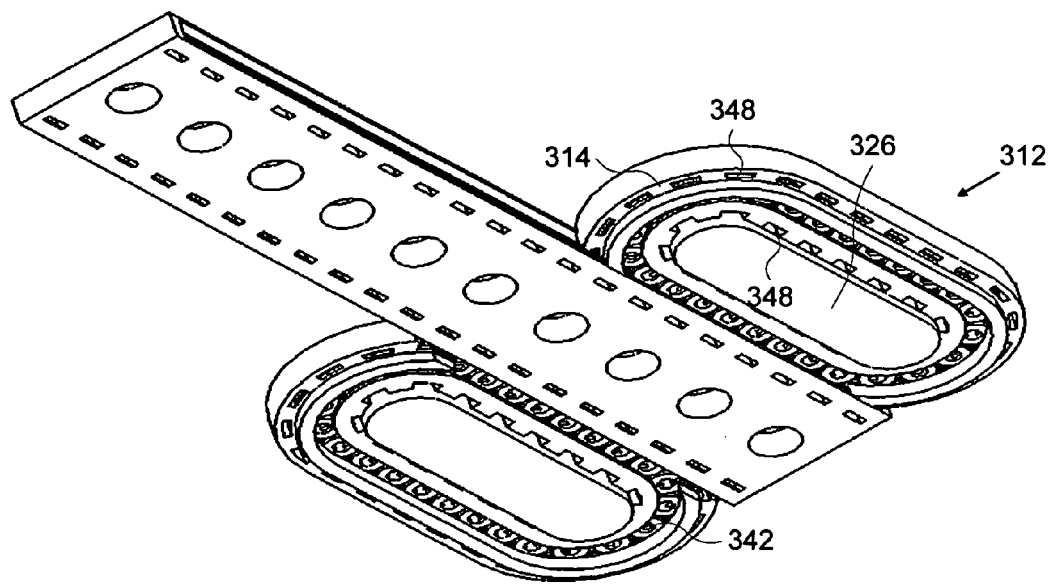
Figure 14A:
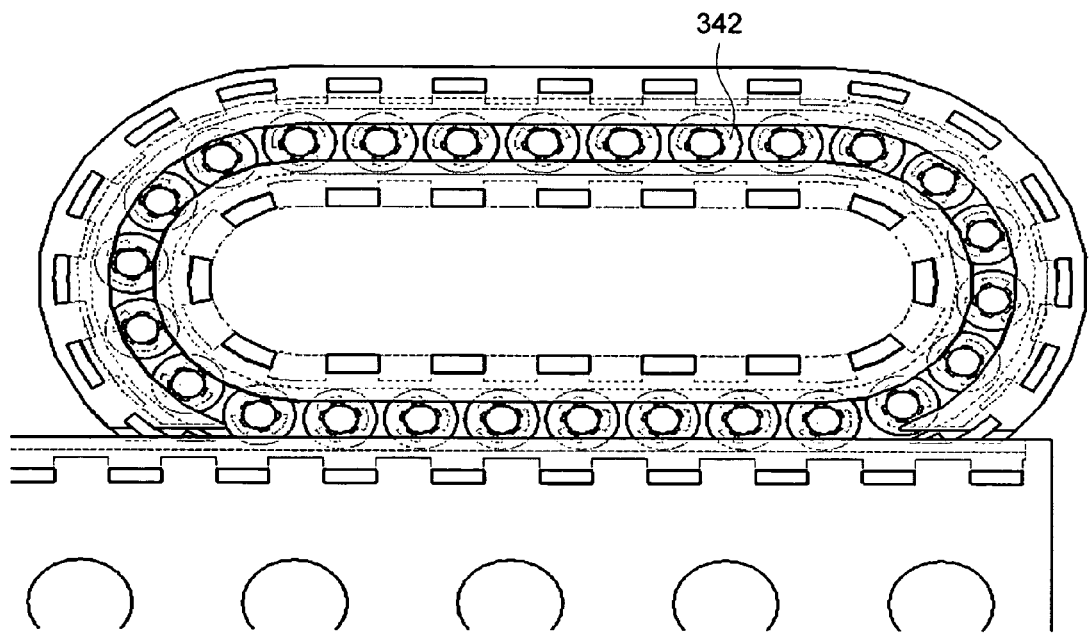
FIGS. 14A-14C provide partially transparent top views of various portions of the linear bearing including one of the bearing carriers.
Figure 14B:
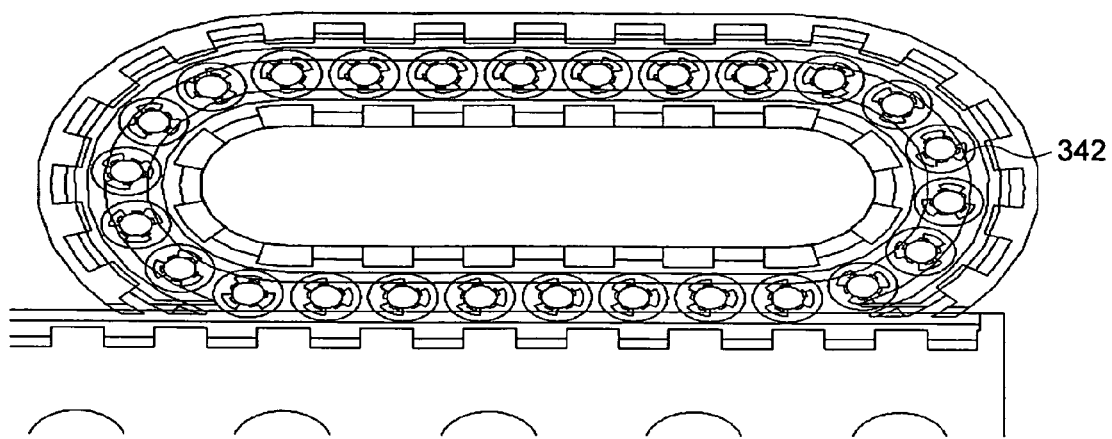
Figure 14C:
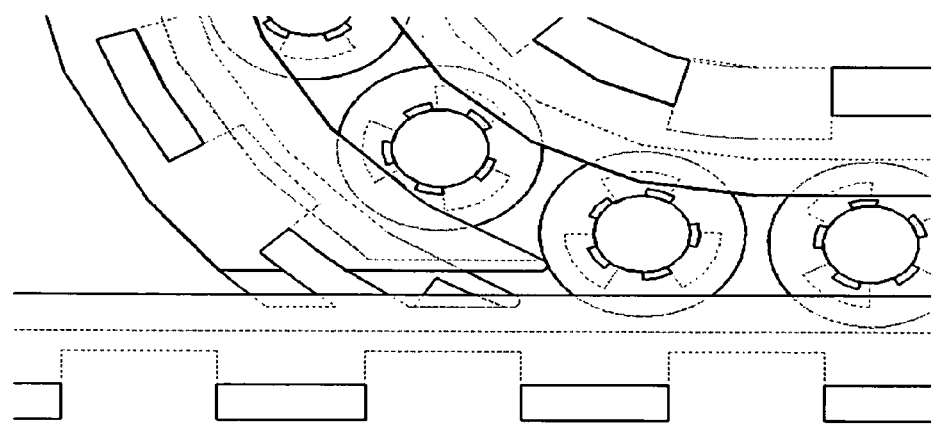
Figure 14D:
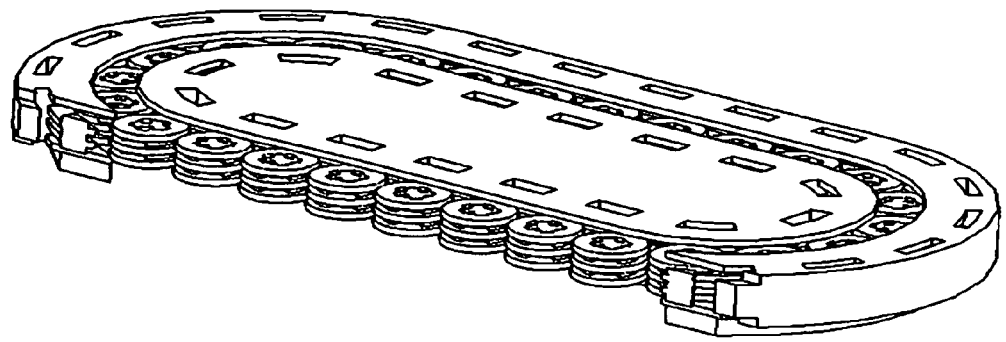
FIG. 14D provides a perspective view of one of the bearing carriers.

FIGS. 12-14D show a recirculating linear bearing similar in design to the rotational roller bearing used in the turbine of FIGS. 8A-11. FIG. 12 provides a perspective view of a portion of translating beam 316 showing release holes and windows. FIGS. 13A and 13B provide top and bottom perspective views of the linear bearing (elements that hold the two bearing carriers in position relative to each other and relative to the translation beam are not shown). FIGS. 14A-14C provide partially transparent top views of various portions of the linear bearing including one of the bearing carriers. FIG. 14D provides a perspective view of one of the bearing carriers of FIGS. 13A and 13B where the rollers which are in a position to contact the translating beam are visible.

Windows 326 and release holes 322 are provided in a similar manner to that noted with regard to the rotary roller bearing embodiment. Here the inner race 326 and outer race 314 have the shape of a racetrack, and one section of the outer race 314 is non-existent to allow contact between the rollers 342 and a translating beam 316 whose sidewall is also provided with projections of similar design to those of the races, to engage the rollers. The bearing carrier 312 includes inner and outer races 326 and 314 which in turn may include openings 348 which aid in releasing sacrificial material. The design allows the carriers to move along the beam while the rollers 342 roll along the beam side wall and side wall of the inner race. As movement pushes one roller between the inner and outer races a fresh roller is moved from the other end of the outer race into position between the inner race and the beam. In some embodiments stops may be provided along the beam and/or on the bearing carrier to limit their relative motion to a desired range. In some embodiments, various mechanical configurations may be used to maintain the bearing carriers in position relative to the beam and/or to each other, for example, inner races may be connected directly or indirectly to one another and or outer races may be connected directly or indirectly to one another, inner and outer races may connected, or other mechanical elements may be provided to ensure maintenance of proper configuration.

Figure 15A:
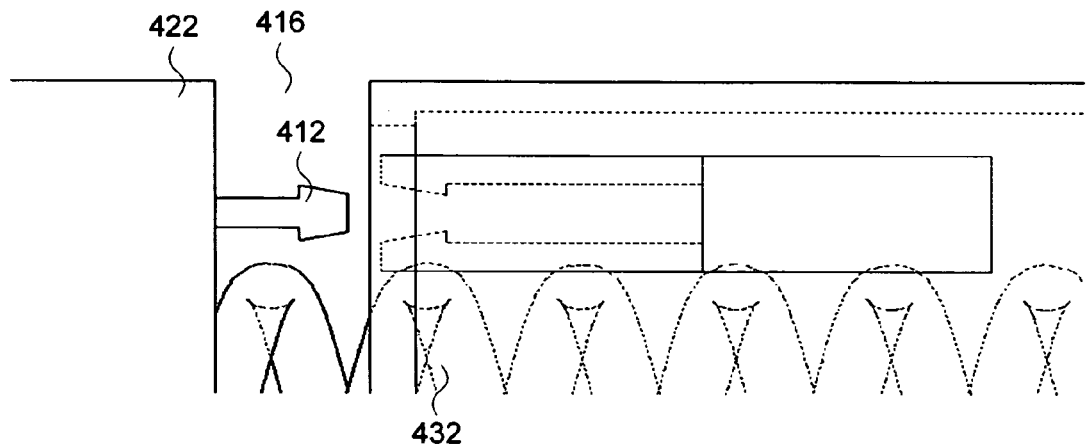
FIGS. 15A-15B depict the shroud in an open configuration with a gap.
Figure 15B:
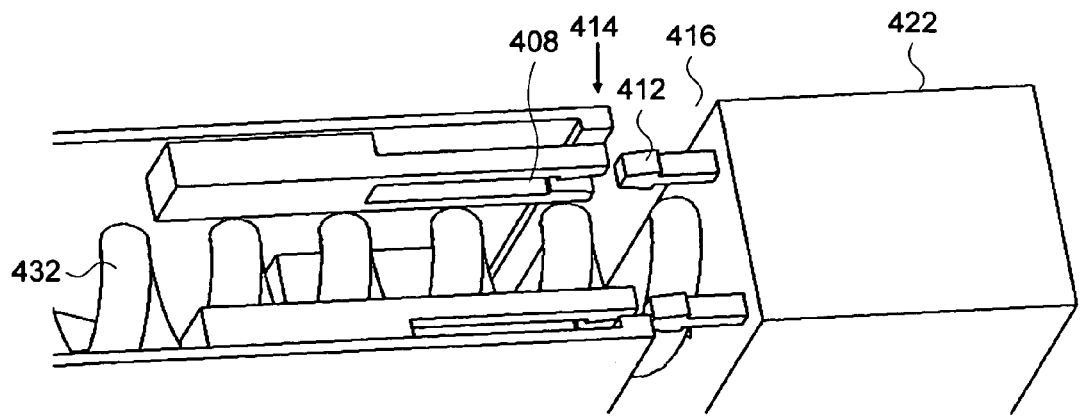

As mentioned earlier, in some embodiments, it is preferred that the shroud be fabricated in an open configuration, with a gap 116 (FIG. 5A) or 416 (FIG. 15A). The movable wall 122 (FIG. 5A) or 422 (FIG. 15A) of the shroud may be supported by a flexure (here a helical spring 432) or other means (such as a slide) that allows the wall to move inward toward the rest of the shroud, closing the gap. For the device to function reasonably well, the gap need not be sealed perfectly, as long as the path of least resistance for the air entering the shroud to escape is by entering the spaces between the impeller blades so as to force the impeller to rotate.

A catch 414 may be designed with two elements, a receptacle 408 and a barb 412. The receptacle may include two flexible arms and protrusions near each end which retain the protrusions on the barb once the barb is inserted between the arms. Multiple catches (e.g. four catches) may be provided, two at each end of the wall. Testing has showed that wall may be moved (using a die shear tool in this case) and then retained by the catches in its final, narrow-gap, position.

In some embodiments, solder may be used to form a bond or even a seal between the movable wall and the body of the shroud after the two elements are brought together. In some such embodiments, the solder may be deposited during formation of the layers and then after removal of sacrificial material, bringing the elements together and reflowing the solder. In other embodiments, other bonding materials may be used.

In some alternative embodiments rollers or other mechanical elements may be vertically shifted via a retention element or elements of the structure or structures that are formed in a vertically offset positions (relative to the roller or other rotational or translational elements) and thereafter they can be translated or rotated into a desired position and then locked into place. For example, in some such alternative embodiments, a layer of the structure may be formed from a solder material alone or in combination with other structural materials. On one side of this layer rotational or linear motion elements that are to be shifted may exist while on the other side of this layer a lid or retention structure may exist. On the layer or layers of the solder or other adhesive material, extensions of the lid or motion elements may exist. After all layers are formed and sacrificial material is released, the solder may be heated, reflowed, and the offset retention structure displaced toward the solder relative to rotational or linearly movable elements so as to contact them and push them downward to a desired position. The displacement of the retention structure may be by a fraction of a layer thickness or an amount greater than a single layer thickness depending on the structural configuration of the elements and the required displacement to achieve the desired positioning. The solder or other adhesive material may form a seal between the components or it may simply bond the components together.

In some alternative embodiments, the protrusions and associated gaps during formation may extend multiple layer thicknesses in height (e.g. two-three layer thicknesses). In some embodiments, the heights of protrusions may vary along the height of the structure. In the various embodiments set forth herein and in various alternatives, the offsetting that occurs may be a fractional portion of the protrusion height, it may equal the protrusion height, it may be greater than the protrusion height, or it may vary if multiple elements to be offset exist within a single device.

In some embodiments, protrusions on elements that rotate may be configured in a symmetrical manner to minimize imbalances that may lead to excessive force or wobble, inappropriate behavior, or shortened device life as a result of excess bearing or bushing wear.

In some embodiments, offsetting to achieve appropriate clearance and/or alignment may occur in a lateral direction (i.e. direction perpendicular to the vertical direction) as opposed to in the vertical direction.

In some alternative embodiments, it may be possible to use non-gaseous low viscosity fluid flows (e.g. liquids such as water or alcohol) to cause movement of the impeller. In other embodiments, the bearing and bushing structures disclosed herein may be used in applications other than linear rails and turbines. In some embodiments, different impellers designs may be implemented, for example those using multiple stacked impellers, those using different vane configurations, those that use vane configurations that allow conversion of axially directed fluid flow into rotational motion of an impeller as opposed to tangentially directed flow of the embodiment of FIGS. 5A and 5B and FIGS. 8A-11.

In still other embodiments, bushings or rollers and/or races may be coated with different materials to improve properties of the bearing or bushing structures. In particular thin coatings of rhodium or other hard material may be applied to surfaces using the coating techniques described in U.S. patent application Ser. No. 11/029,221, by Cohen, et al., filed Jan. 3, 2005, and entitled "Electrochemical Fabrication Process for Forming Multilayer Multimaterial Microprobe Structures", which is hereby incorporated herein by reference. In some embodiments, pores or small gaps in structural elements may be used to hold lubricant or other fluids which may provide improved operation or enhanced application for the devices.

In some embodiments, the turbines of the present invention may be used to drive, for example, electric motors, gears, encoders, or other electrical, mechanical, or optical structures. The turbines may be driven to provide a desired rotary output for some purpose or rotation of the turbines or movement of linear elements may be used as sensing elements (e.g. when coupled to appropriate electronic components.

In some alternative embodiments, the impeller of the turbine may include a shaft or inner race which is located within the bore or outer race of a mounting as opposed to the opposite configuration discussed herein above.

Some alternative embodiments may employ mask based selective etching operations in conjunction with blanket deposition operations. Some embodiments may form structures on a layer-by-layer basis but deviate from a strict planar layer on planar layer build up process in favor of a process that interlacing material between some or all layers. Such alternating build processes are disclosed in U.S. application Ser. No. 10/434,519, filed on May 7, 2003, entitled Methods of and Apparatus for Electrochemically Fabricating Structures Via Interlaced Layers or Via Selective Etching and Filling of Voids which is herein incorporated by reference as if set forth in full.

Some embodiments may employ diffusion bonding or the like to enhance adhesion between successive layers of material. Various teachings concerning the use of diffusion bonding in electrochemical fabrication processes are set forth in U.S. patent application Ser. No. 10//841,384 which was filed May 7, 2004 by Cohen et al. which is entitled "Method of Electrochemically Fabricating Multilayer Structures Having Improved Interlayer Adhesion" and which is hereby incorporated herein by reference as if set forth in full.

Further teachings about planarizing layers and setting layers thicknesses and the like are set forth in the following US Patent Applications which were filed Dec. 31, 2003: (1) U.S. Patent Application No. 60/534,159 by Cohen et al. and which is entitled "Electrochemical Fabrication Methods for Producing Multilayer Structures Including the use of Diamond Machining in the Planarization of Deposits of Material" and (2) U.S. Patent Application No. 60/534,183 by Cohen et al. and which is entitled "Method and Apparatus for Maintaining Parallelism of Layers and/or Achieving Desired Thicknesses of Layers During the Electrochemical Fabrication of Structures". The techniques disclosed explicitly herein may benefit by combining them with the techniques disclosed in U.S. patent application Ser. No. 11/029,220 filed Jan. 3, 2005 by Frodis et al. and entitled "Method and Apparatus for Maintaining Parallelism of Layers and/or Achieving Desired Thicknesses of Layers During the Electrochemical Fabrication of Structures". These patent filings are each hereby incorporated herein by reference as if set forth in full herein.

Additional teachings concerning the formation of structures on dielectric substrates and/or the formation of structures that incorporate dielectric materials into the formation process and possibility into the final structures as formed are set forth in a number of patent applications: (1) U.S. Patent Application No. 60/534,184, by Cohen, which as filed on Dec. 31, 2003, and which is entitled "Electrochemical Fabrication Methods Incorporating Dielectric Materials and/or Using Dielectric Substrates"; (2) U.S. Patent Application No. 60/533,932, by Cohen, which was filed on Dec. 31, 2003, and which is entitled "Electrochemical Fabrication Methods Using Dielectric Substrates"; (3) U.S. Patent Application No.

60/534,157, by Lockard et al., which was filed on Dec. 31, 2003, and which is entitled "Electrochemical Fabrication Methods Incorporating Dielectric Materials"; (4) U.S. Patent Application No. 60/574,733, by Lockard et al., which was filed on May 26, 2004, and which is entitled "Methods for Electrochemically Fabricating Structures Using Adhered Masks, Incorporating Dielectric Sheets, and/or Seed Layers that are Partially Removed Via Planarization"; (5) U.S. Patent Application No. 60/533,895, by Lembrikov et al., which was filed on Dec. 31, 2003, and which is entitled "Electrochemical Fabrication Method for Producing Multi-layer Three-Dimensional Structures on a Porous Dielectric"; (6) U.S. patent application Ser. No. 11/029,216 filed Jan. 3, 2005, by Cohen et al. and entitled "Electrochemical Fabrication Methods Incorporating Dielectric Materials and/or Using Dielectric Substrates"; and (7) U.S. patent application Ser. No. 11/139,262, filed May 26, 2005, by Lockard et al., and entitled "Methods for Electrochemically Fabricating Structures Using Adhered Masks, Incorporating Dielectric Sheets, and/or Seed Layers That Are Partially Removed Via Planarization". Each of these patent filings is hereby incorporated herein by reference as if set forth in full herein.

Some embodiments may not use any blanket deposition process and/or they may not use a planarization process. Some embodiments may involve the selective deposition of a plurality of different materials on a single layer or on different layers. Some embodiments may use blanket or selective depositions processes that are not electrodeposition processes. Some embodiments may use conformable contact masks, non-conformable masks, proximity masks, and/or adhered masks for selective patterning operations. Some embodiments may use nickel as a structural material while other embodiments may use different materials such as various nickel alloys, gold, silver, or any other depositable materials that can be separated from a selected sacrificial material or materials (e.g. copper and/or some other sacrificial material). Some embodiments, may deposit some or all materials using non-electrodeposition processes. Some embodiments may use copper as the structural material with or without a sacrificial material. Some embodiments may remove all sacrificial material while other embodiments may not.

Many other alternative embodiments will be apparent to those of skill in the art upon reviewing the teachings herein. Further embodiments may be formed from a combination of the various teachings explicitly set forth in the body of this application. Even further embodiments may be formed by combining the teachings set forth explicitly herein with teachings set forth in the various applications and patents referenced herein, each of which is incorporated herein by reference. In view of the teachings herein, many further embodiments, alternatives in design and uses of the instant invention will be apparent to those of skill in the art. As such, it is not intended that the invention be limited to the particular illustrative embodiments, alternatives, and uses described above but instead that it be solely limited by the claims presented hereafter.

I claim:

1. A fabrication process for producing a microscale or mesoscale three-dimensional structure, comprising at least one structural material, from a plurality of adhered layers, comprising at least one structural material and at least one sacrificial material, the process comprising:

(A) forming a first layer by depositing at least one structural material and at least one sacrificial material and planarizing the at least one structural material and the at least one sacrificial material to produce a planarized layer having a desired lower boundary level and a desired upper boundary level;

(B) forming a plurality of layers such that each successive layer is formed adjacent to and adhered to a previously formed layer along an axis of layer formation, wherein an initial successive layer is formed adjacent to and adhered to the first layer, and wherein said forming comprises repeating (A) multiple times;

(C) after forming the plurality of layers, separating the at least one sacrificial material from the at least one structural material such that two components of the structure can move relative to one another, wherein each of the two components have at least one surface that opposes a surface of the other component wherein at least one of the opposing surfaces comprises a plurality of protrusions and the other opposing surface comprises at least one protrusion, and wherein opposing protrusions exist on different layers, wherein a lateral separation between neighboring opposing protrusions is less than a minimum feature size for a gap in structural material on a single layer;

(D) displacing the two components along the axis of layer formation such that one of the plurality of protrusions is shifted relative to the at least one protrusion so that at least a portion of the protrusions at least partially align along the axis of layer formation;

(E) after said displacing, rotating the two components relative to one another about an axis parallel to the axis of layer formation.

2. A fabrication process for producing a microscale or mesoscale three-dimensional structure, comprising at least one structural material, from a plurality of adhered layers, comprising at least one structural material and at least one sacrificial material, the process comprising:

(A) forming a first layer by depositing at least one structural material and at least one sacrificial material and planarizing the at least one structural material and the at least one sacrificial material to produce a planarized layer having a desired lower boundary level and a desired upper boundary level;

(B) forming a plurality of layers such that each successive layer is formed adjacent to and adhered to a previously formed layer along an axis of layer formation, wherein an initial successive layer is formed adjacent to and adhered to the first layer, and wherein said forming comprises repeating (A) multiple times;

(C) after forming the plurality of layers, separating the at least one sacrificial material from the at least one structural material such that two components of the structure can move relative to one another, wherein each of the two components have at least one surface that opposes a surface of the other component wherein at least one of the opposing surfaces comprises a plurality of protrusions and the other opposing surface comprises at least one protrusion, and wherein opposing protrusions exist on different layers, wherein a lateral separation between neighboring opposing protrusions is less than a minimum feature size for a gap in structural material on a single layer;

(D) rotating the two components relative to one another about an axis parallel to the axis of layer formation.

3. The process of claim 2 wherein a first protrusion exists on an nth layer and wherein a second opposing protrusion exists on an (n+1)th layer, and a third protrusion which opposes the second protrusion exists on an (n+2)th layer.

4. The process of claim 2 wherein a plurality of first protrusions exist on an nth and an (n+2)th layer and wherein a plurality second opposing protrusions exists on an (n+1)th layer and an (n+3)th layer.

5. The fabrication process of claim 1 wherein the three-dimensional structure comprises a turbine having an impeller, a shaft, and a bore, wherein the first component comprises the bore and the second component comprises the shaft and wherein the shaft has a longitudinal axis parallel to the axis of layer formation, and wherein the bore and shaft have an effective radial spacing at a given axial level which is smaller than the minimum feature size.

6. The fabrication process of claim 1 wherein the three-dimensional structure comprises a turbine having an impeller, at least one pair of races and a plurality of rollers, wherein each of the impeller, the races, and the rollers are formed from a plurality of the adhered layers and wherein the races are rotatable with respect to one another along an axis which is parallel to the axis of layer formation and which are separated from one another by the plurality of rollers which are also rotatable relative to the pair of races and wherein an effective spacing between the races and the rollers is less than the minimum feature size at a given axial level.

7. The fabrication process of claim 1 wherein the three-dimensional structure comprises a linear translator having a beam, at least one pair of races and a plurality of rollers wherein each of the beam, the races, and the rollers are formed from a plurality of the adhered layers and wherein each of the races are rotatable with respect to the beam along an axis which is parallel to the axis of layer formation and wherein the beam is separated from each race by the plurality of rollers, wherein the races and rollers are rotatable relative to each other and wherein an effective spacing between the races and the rollers is less than the minimum feature size at a given axial level.

8. The fabrication process of claim 1 wherein the three-dimensional structure comprises at least one pair of races and a plurality of rollers, wherein each of the races and the rollers are formed from a plurality of the adhered layers and wherein the races are rotatable with respect to one another along an axis which is parallel to the axis of layer formation and which are separated from one another by the plurality of rollers which are also rotatable relative to the pair of races and wherein an effective spacing between the races and the rollers is less than the minimum feature size at the a given axial level.

9. The fabrication process of claim 1 wherein the three-dimensional structure comprises a bushing having at least one shaft and at least one bore formed from a plurality of adhered layers and wherein the shaft and bore are rotatable with respect to one another along an axis which is parallel to the axis of layer formation where the spacing between the bore and the shaft have an effective radial spacing at a given axial level that is less than the minimum feature size at the given axial level.

10. The fabrication process of claim 2 wherein the three-dimensional structure comprises a turbine having an impeller, a shaft, and a bore, wherein the first component comprises the bore and the second component comprises the shaft and wherein the shaft has a longitudinal axis parallel to the axis of layer formation, and wherein the bore and shaft have an effective radial spacing at a given axial level which is smaller than the minimum feature size.

11. The fabrication process of claim 2 wherein the three-dimensional structure comprises a turbine having an impeller, at least one pair of races and a plurality of rollers, wherein each of the impeller, the races, and the rollers are formed from a plurality of the adhered layers and wherein the races are rotatable with respect to one another along an axis which is parallel to the axis of layer formation and which are separated from one another by the plurality of rollers which are also rotatable relative to the pair of races and wherein an effective spacing between the races and the rollers is less than the minimum feature size at a given axial level.

12. The fabrication process of claim 2 wherein the three-dimensional structure comprises a linear translator having a beam, at least one pair of races and a plurality of rollers wherein each of the beam, the races, and the rollers are formed from a plurality of the adhered layers and wherein each of the races are rotatable with respect to the beam along an axis which is parallel to the axis of layer formation and wherein the beam is separated from each race by the plurality of rollers, wherein the races and rollers are rotatable relative to each other and wherein an effective spacing between the races and the rollers is less than the minimum feature size at a given axial level.

13. The fabrication process of claim 2 wherein the three-dimensional structure comprises at least one pair of races and a plurality of rollers, wherein each of the races and the rollers are formed from a plurality of the adhered layers and wherein the races are rotatable with respect to one another along an axis which is parallel to the axis of layer formation and which are separated from one another by the plurality of rollers which are also rotatable relative to the pair of races and wherein an effective spacing between the races and the rollers is less than the minimum feature size at a given axial level.

14. The fabrication process of claim 2 wherein the three-dimensional structure comprises a bushing having at least one shaft and at least one bore formed from a plurality of adhered layers and wherein the shaft and bore are rotatable with respect to one another along an axis which is parallel to the axis of layer formation where the spacing between the bore and the shaft have an effective radial spacing at a given axial level that is less than the minimum feature size at the given axial level.

* * * * *